(12) United States Patent
Wakabayashi

(10) Patent No.: US 10,001,655 B2
(45) Date of Patent: Jun. 19, 2018

(54) IMAGE DISPLAY DEVICE

(71) Applicant: Seiko Epson Corporation, Tokyo (JP)

(72) Inventor: Shuichi Wakabayashi, Okaya (JP)

(73) Assignee: Seiko Epson Corporation (JP)

( * ) Notice: Subject to any disclaimer, the term of this patent is extended or adjusted under 35 U.S.C. 154(b) by 0 days. days.

(21) Appl. No.: 15/049,713

(22) Filed: Feb. 22, 2016

(65) Prior Publication Data

US 2016/0252742 A1   Sep. 1, 2016

(30) Foreign Application Priority Data

Feb. 27, 2015 (JP) ................. 2015-038583

(51) Int. Cl.
G02B 27/02 (2006.01)
G02B 27/42 (2006.01)
F21V 8/00 (2006.01)
G02B 27/01 (2006.01)
G02B 27/00 (2006.01)
G02B 26/08 (2006.01)
G02B 26/10 (2006.01)

(52) U.S. Cl.
CPC ....... G02B 27/4227 (2013.01); G02B 6/0026 (2013.01); G02B 26/085 (2013.01); G02B 26/101 (2013.01); G02B 27/0081 (2013.01); G02B 27/0103 (2013.01); G02B 27/0172 (2013.01); G02B 27/4277 (2013.01); G02B 2027/0125 (2013.01); G02B 2027/0174 (2013.01); G02B 2027/0178 (2013.01)

(58) Field of Classification Search
CPC combination set(s) only.
See application file for complete search history.

(56) References Cited

U.S. PATENT DOCUMENTS 7,085,027 B2    8/2006  Ouchi et al.
2011/0164294 A1* 7/2011  Shimizu ............ G02B 27/0172
                                                        359/13
2012/0032874 A1* 2/2012  Mukawa ................. G02B 3/12
                                                          345/8
2014/0204438 A1  7/2014  Yamada et al.
2014/0340749 A1  11/2014 Yamada et al.
(Continued)

FOREIGN PATENT DOCUMENTS

JP    2008-203772 A    9/2008
JP      4492536 B2     6/2010
(Continued)

Primary Examiner — Van N Chow
(74) Attorney, Agent, or Firm — Harness, Dickey & Pierce, P.L.C.

(57) ABSTRACT

An image display device includes: a video light generation unit that generates video light modulated based on a video signal; a light diffraction unit (first diffraction optical element) that diffracts the video light emitted from the video light generation unit; a light scanning unit (light scanner) that spatially scans the video light; and a reflection unit that includes a light diffraction unit (second diffraction optical element) that diffracts video light scanned by the light scanning unit. A light reflection unit included in the light scanning unit is configured by the light diffraction unit. In the light diffraction unit, an interference fringe pitch is preferably constant. The light diffraction unit has portions in which interference fringe pitches are mutually different.

9 Claims, 14 Drawing Sheets

(56) References Cited

U.S. PATENT DOCUMENTS

2015/0062715 A1 3/2015 Yamada et al.
2016/0161755 A1 6/2016 Yonekubo et al.

FOREIGN PATENT DOCUMENTS

| | | | |
|---|---|---|---|
| JP | 2014-078022 | A | 5/2014 |
| JP | 2014-142386 | A | 8/2014 |
| JP | 2014-222302 | A | 11/2014 |
| JP | 2014-224846 | A | 12/2014 |
| JP | 2015-049278 | A | 3/2015 |
| JP | 2015-053163 | A | 3/2015 |
| JP | 2015-102613 | A | 6/2015 |
| JP | 2016-109923 | A | 6/2016 |

\* cited by examiner

FIRST DRIVING SIGNAL
(HORIZONTAL SCANNING DRIVING SIGNAL)

SECOND DRIVING SIGNAL
(VERTICAL SCANNING DRIVING SIGNAL)

IMAGE DISPLAY DEVICE

BACKGROUND

1. Technical Field

The present invention relates to an image display device.

2. Related Art

Head-mounted displays (HMDs) are known as display devices that directly radiate lasers to retinas of pupils and cause users to view images.

Head-mounted displays generally include light-emitting devices that emit light and scanning units that change light paths so that the emitted light scans retinas of users. Such a head-mounted display enables a user to simultaneously view both of, for example, an outside scenery and an image depicted by the scanning unit.

For example, JP-A-2014-78022 discloses an image display device including a light source, a scanning unit that scans parallel light emitted from the light source, and an optical device that relays and emits the parallel light scanned by the scanning unit toward eyes. Of these units, the optical device is disclosed which includes a light-guiding plate configured to propagate incident light by total reflection therein and then emits the light, a first diffraction grating member that diffracts the light so that the light incident on the light-guiding plate is totally reflected, and a second diffraction grating member that diffracts the light so that the light totally propagated by the total reflection can be emitted from the light-guiding plate.

In the image display device disclosed in JP-A-2014-78022, the light scanned by the scanning unit is configured to be incident on the first diffraction grating member. Since the light incident on the first diffraction grating member is scanned over a two-dimensional scanning range with a constant area, it is necessary for the first diffraction grating member to have a sufficient size so that the light can be received. As a result, the size of the image display device disclosed in JP-A-2014-78022 may be necessarily increased.

SUMMARY

An advantage of some aspects of the invention is to provide an image display device capable of suppressing deviation in a diffraction angle caused in diffraction and performing high-quality display while suppressing an increase in the size of the device.

The advantage can be achieved by the invention described below.

An image display device according to an aspect of the invention includes: a video light generation unit that generates video light modulated based on a video signal; a first diffraction optical element that diffracts the video light emitted from the video light generation unit; a light scanner that includes a light reflection unit and spatially scans the video light by reflecting the video light in the light reflection unit; and a second diffraction optical element that diffracts the incident video light when the video light scanned by the light scanner is incident. The light reflection unit is configured by the first diffraction optical element.

Accordingly, since the first diffraction element is small, an increase in the size of the device is suppressed and deviation in a diffraction angle caused in the diffraction can be suppressed. Therefore, it is possible to obtain the image display device capable of performing high-quality display.

In the image display device according to the aspect of the invention, it is preferable that, in the second diffraction optical element, a surface shape on an incident side of the video light is a concave surface in a direction perpendicular to a diffraction grating of the second diffraction optical element.

With this configuration, since the second diffraction optical element has the equivalent function to a condensing lens, a function of condensing the video light toward the eye of the observer is enhanced. As a result, the observer can view the video with a large angle of view and high quality.

In the image display device according to the aspect of the invention, it is preferable that the light scanner performs main scanning of the video light in a first direction and performs sub-scanning of the video light in a second direction orthogonal to the first direction, in the first diffraction optical element, a diffraction grating period is constant, and the second diffraction optical element has portions in which the diffraction grating period is mutually different from a diffraction grating period on a scanning line of the main scanning passing through a center of an amplitude of the sub-scanning of the video light incident on the second diffraction optical element.

With this configuration, the video light projected to the second diffraction optical element while being scanned two-dimensionally can be diffracted to be incident on the eye of the observer in the second diffraction optical element. Therefore, the observer can view the video with a large angle of view and high quality.

In the image display device according to the aspect of the invention, it is preferable that the diffraction grating period of the first diffraction optical element is between a maximum value and a minimum value of the diffraction grating period on the scanning line of the main scanning pas sing through the center of the amplitude of the sub-scanning of the video light incident on the second diffraction optical element.

With this configuration, the angle width of the diffraction angles occurring in diffraction of the first diffraction optical element can be sufficiently offset in diffraction of the second diffraction optical element in the substantially entire region of the second diffraction optical element.

In the image display device according to the aspect of the invention, it is preferable that the diffraction grating period of the first diffraction optical element is the same as a diffraction grating period at a position of a center of an amplitude of the main scanning and on the scanning line of the main scanning passing through the center of the amplitude of the sub-scanning of the video light incident on the second diffraction optical element.

With this configuration, the angle width of the diffraction angles occurring in the diffraction of the first diffraction optical element can be sufficiently offset in the diffraction of the second diffraction optical element in the substantially entire region of the second diffraction optical element.

In the image display device according to the aspect of the invention, it is preferable that the diffraction grating period of the first diffraction optical element is the same as an average value of the diffraction grating period on the scanning line of the main scanning passing through the center of the amplitude of the sub-scanning of the video light incident on the second diffraction optical element.

With this configuration, the angle width of the diffraction angles occurring in the diffraction of the first diffraction optical element can be sufficiently offset in the diffraction of the second diffraction optical element in the substantially entire region of the second diffraction optical element.

In the image display device according to the aspect of the invention, it is preferable that an extension direction of the diffraction grating of the second diffraction optical element is orthogonal to the first direction.

With this configuration, the angle width of the diffraction angles occurring in the diffraction of the first diffraction optical element can be reliably offset in the diffraction of the second diffraction optical element.

In the image display device according to the aspect of the invention, it is preferable that the light scanner includes a driving system that reciprocates and rotates the light reflection unit, and when $\gamma_0$ is an amplitude of the reciprocation and the rotation, $\alpha$ is an angle formed by an optical axis of the video light and a normal line of the light reflection unit when the light reflection unit does not rotate, and $\beta_0$ is a minimum value of an angle formed by the light axis of the video light incident on the light reflection unit when the light reflection unit reciprocates and rotates and the light axis of the video light emitted from the light reflection unit, a formula below is satisfied.

$$\alpha < \frac{\beta_0 - \gamma_0}{2}$$

With this configuration, it is possible to reduce a probability at which the reflected light reflected from the surface of the first diffraction element becomes stray light to be viewed. As a result, it is possible to suppress deterioration in visibility of the video.

It is preferable that the image display device according to the aspect of the invention further includes a pupil expansion optical system that is provided on a light path between the light scanner and the second diffraction optical element.

With this configuration, it is possible to expand a light flux width (cross-sectional area) of the video light, and thus improve the visibility.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an image display device according to the invention will be described in detail according to embodiments illustrated in the accompanying drawings.

First Embodiment

First, a first embodiment of the image display device according to the invention will be described.

Figure 1:
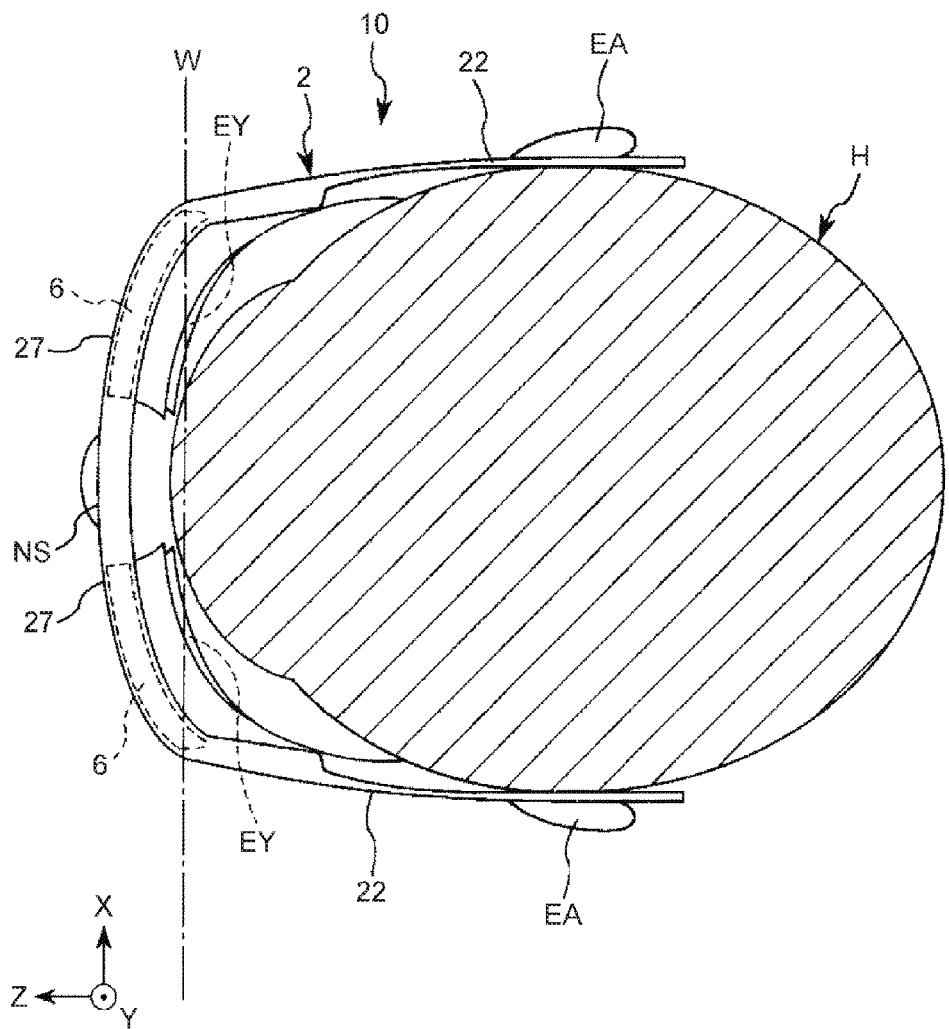
FIG. 1 is a diagram illustrating an overall configuration of a head-mounted display of a first embodiment including an image display device according to the invention.
Figure 2:
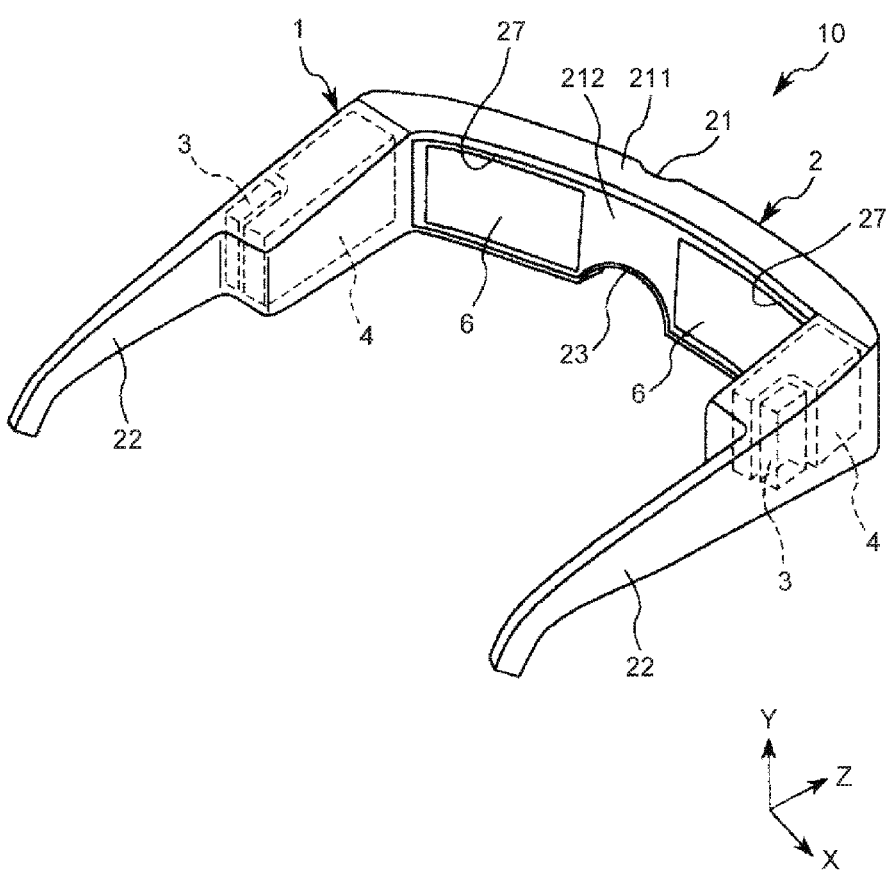
FIG. 2 is a schematic perspective view illustrating the head-mounted display illustrated in FIG. 1.
Figure 3:
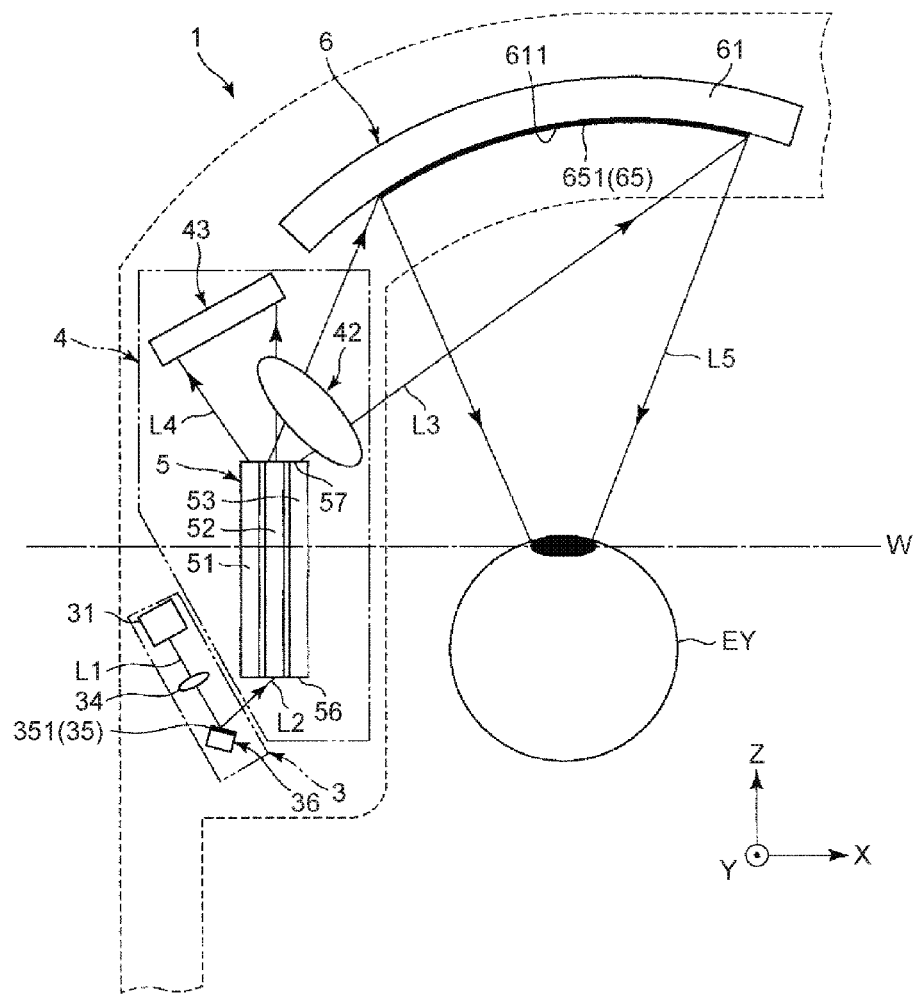
FIG. 3 is a diagram schematically illustrating the configuration of the image display device illustrated in FIG. 1.
Figure 4:
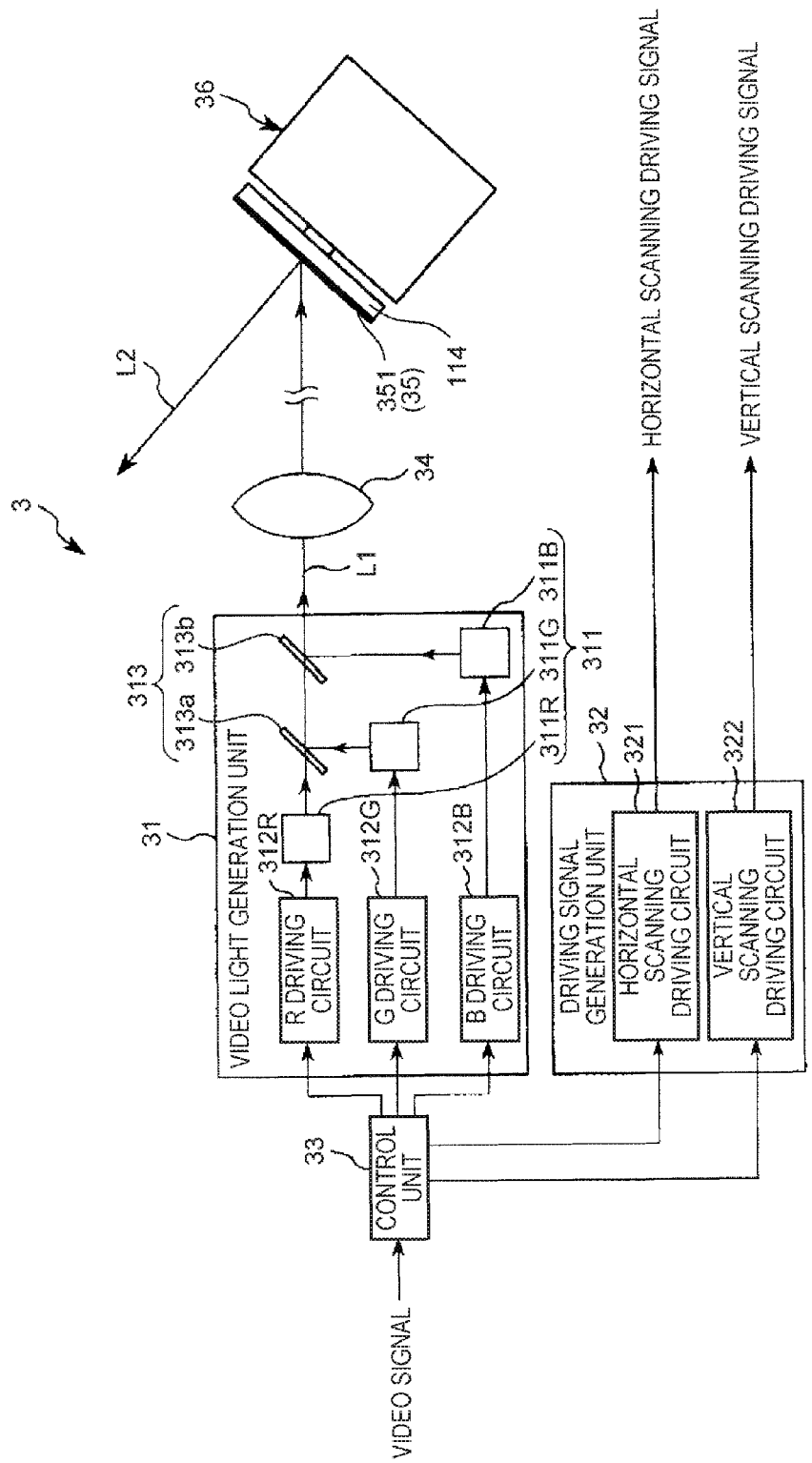
FIG. 4 is a diagram schematically illustrating the configuration of an image generation unit illustrated in FIG. 2.
Figure 5A:
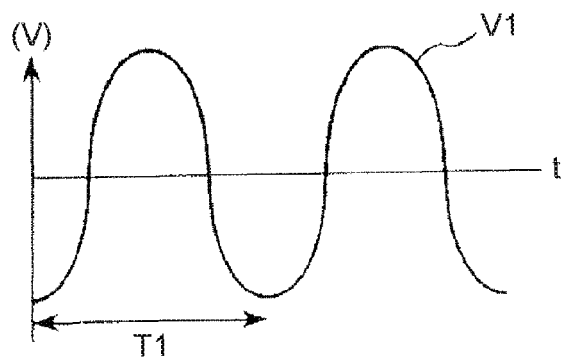
FIGS. 5A and 5B are diagrams illustrating examples of driving signals of a driving signal generation unit illustrated in FIG. 4.
Figure 5B:
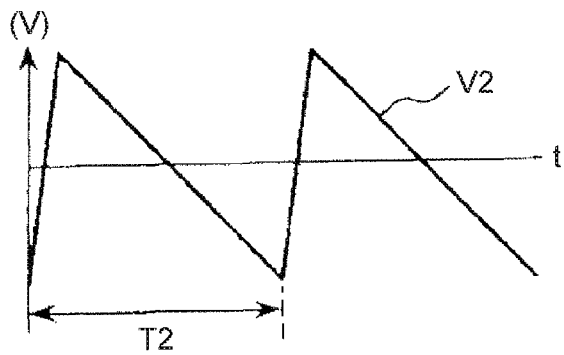
Figure 6:
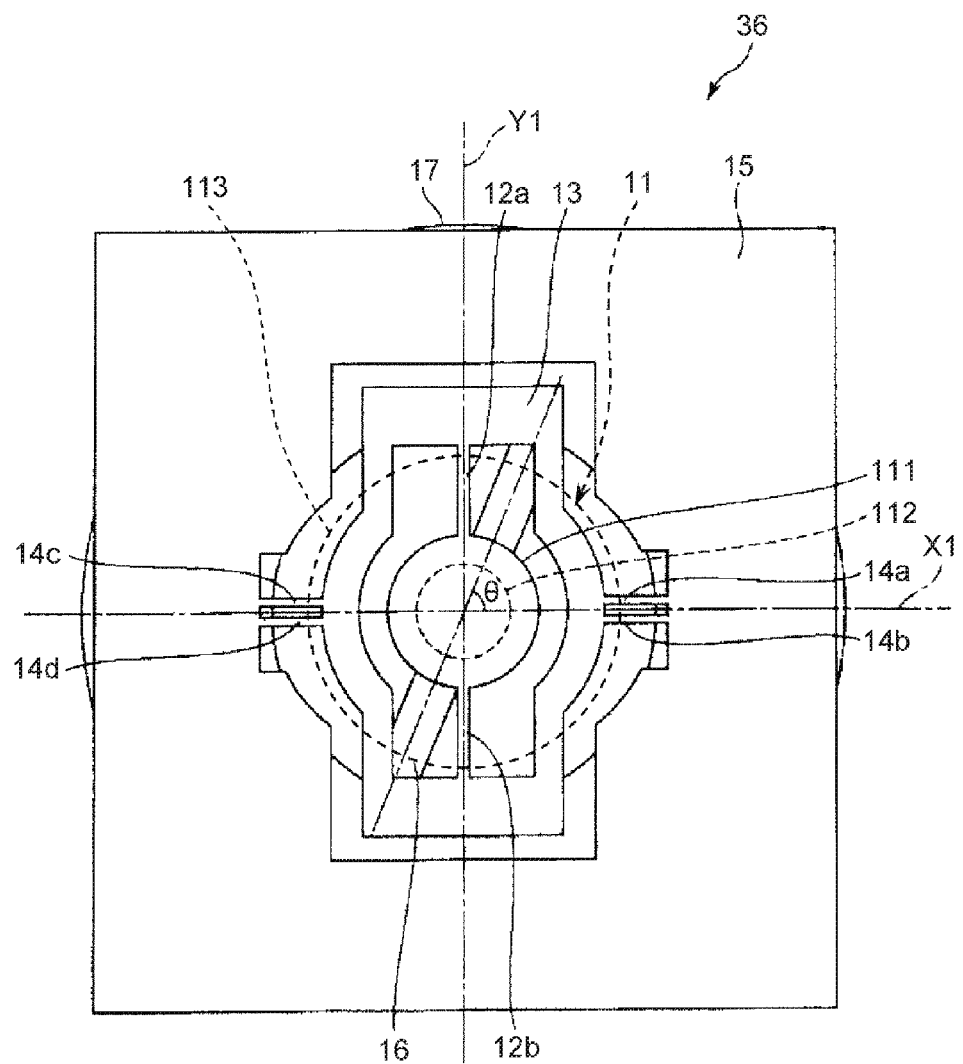
FIG. 6 is a plan view illustrating a light scanning unit illustrated in FIG. 4.
Figure 7:
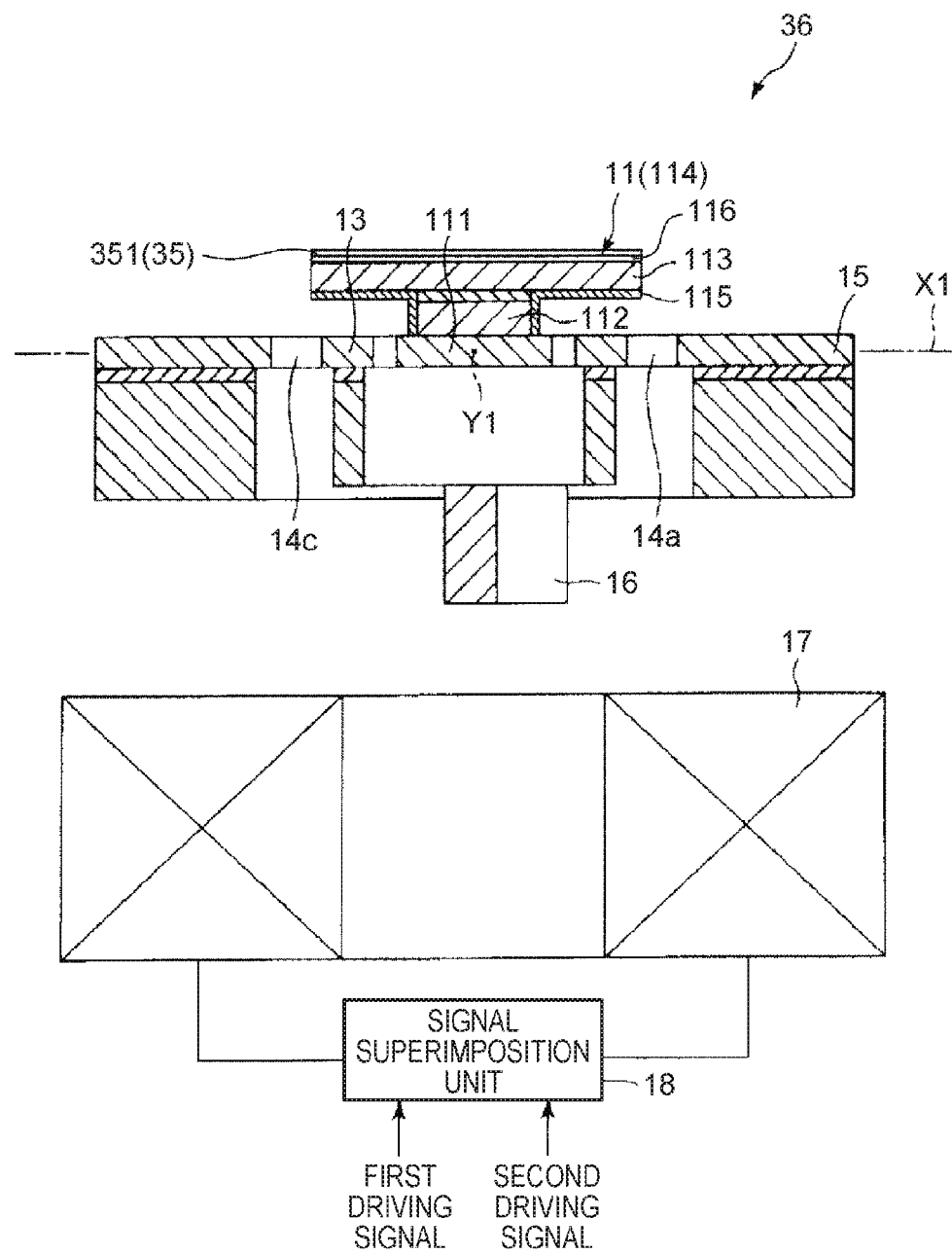
FIG. 7 is a sectional view (a section view taken along an X1 axis) illustrating the light scanning unit illustrated in FIG. 6.

FIG. 1 is a diagram illustrating an overall configuration of a head-mounted display of a first embodiment including an image display device according to the invention. FIG. 2 is a schematic perspective view illustrating the head-mounted display illustrated in FIG. 1. FIG. 3 is a diagram schematically illustrating the configuration of the image display device illustrated in FIG. 1. FIG. 4 is a diagram schematically illustrating the configuration of an image generation unit illustrated in FIG. 2. FIGS. 5A and 5B are diagrams illustrating examples of driving signals of a driving signal generation unit illustrated in FIG. 4. FIG. 6 is a plan view illustrating a light scanning unit illustrated in FIG. 4. FIG. 7 is a sectional view (a section view taken along an X1 axis) illustrating the light scanning unit illustrated in FIG. 6. FIGS. 8A, 8B, 8C and 8D are a front view, a plan view, a right side view, and a left side view illustrating an overall configuration of a pupil expansion optical system illustrated in FIG. 3. FIG. 9 is a diagram illustrating a path of video light incident on the pupil expansion optical system illustrated in FIGS. 8A to 8D.

In FIGS. 1 to 3, to facilitate the description, the X, Y, and Z axes are illustrated as 3 axes that are mutually orthogonal to each other. The leading sides and the base sides of arrows illustrated in the drawings are referred to as "+ (positive)" and "− (negative)", respectively. A direction parallel to the X axis is referred to as an "X axis direction", a direction parallel to the Y axis is referred to as a "Y axis direction", and a direction parallel to the Z axis is referred to as a "Z axis direction".

Here, the X, Y, and Z axes are set so that the X axis direction is the right and left directions of a head H, the Y axis direction is the upper and lower directions of the head H, and the Z axis direction is the front and rear direction of the head H when the image display device 1 is mounted on the head H of an observer.

As illustrated in FIG. 1, a head-mounted display (head-mounted image display device) 10 including the image display device 1 according to the embodiment has the same outer appearance as glasses, is mounted on the head H of the observer for use, and causes the observer to view an image formed as a virtual image so that the image overlaps with an outside image.

As illustrated in FIGS. 1 and 2, the head-mounted display 10 includes a frame 2 and the image display device 1 including an image generation unit 3, an expansion optical system 4, and a reflection unit 6.

In the head-mounted display 10, the image generation unit 3 generates video light modulated based on a video signal, the expansion optical system 4 expands a light flux width (cross-sectional area) of the video light, and the reflection unit 6 guides the video light expanded by the expansion optical system 4 to an eye EY of the observer. Accordingly, a virtual image according to the video signal can be caused to be viewed by the observer.

In the head-mounted display 10, the image generation units 3, the expansion optical systems 4, and the reflection units 6 included in the image display devices 1 are provided on the right and left sides of the frame 2 and are disposed to be bilaterally symmetric using a YZ plane as a reference. The image generation unit 3, the expansion optical system 4, and the reflection unit 6 provided on the right side of the frame 2 form a right-eye virtual image. The image generation unit 3, the expansion optical system 4, and the reflection unit 6 provided on the left side of the frame 2 form a left-eye virtual image.

In the embodiment, the head-mounted display 10 is configured to include the image generation units 3, the expansion optical systems 4, and the reflection units 6 on the right and left sides of the frame 2 and form the right-eye virtual image and the left-eye virtual image, but the invention is not limited thereto. For example, the image generation unit 3, the expansion optical system 4, and the reflection unit 6 may be provided only on the left side of the frame 2 to form only the left-eye virtual image. In contrast, the image generation unit 3, the expansion optical system 4, and the reflection unit 6 may be provided only on the right side of the frame 2 to form only the right-eye virtual image. That is, the head-mounted display 10 is not limited to the binocular type head-mounted display 10 as in the embodiment, but a monocular type head-mounted display may be used.

Hereinafter, the units of the head-mounted display 10 will be sequentially described in detail.

The two image generation units 3, the two expansion optical systems 4, and the two reflection units 6 have the same configuration. Therefore, the image generation unit 3, the expansion optical system 4, and the reflection unit 6 provided on the left side of the frame 2 will be focused on in the description.

Frame

As illustrated in FIG. 2, the frame 2 has the same shape as a glasses frame and has a function of holding the image generation unit 3, the expansion optical system 4, and the reflection unit 6 included in the image display device 1.

The frame 2 includes a front unit 21 that includes a rim 211 and a shade portion 212 and temples 22 that extend in the Z axis direction from both of the right and left ends of the front unit 21.

The shade portion 212 is a member that has a function of suppressing transmission of outside light and holds the reflection unit 6. The shade portion 212 has a concave portion 27 opening toward the side of the observer therein. The reflection unit 6 is provided in the concave portion 27. The shade portion 212 holding the reflection unit 6 is held by the rim 211.

A nose pad 23 is provided in the middle portion of the shade portion 212. The nose pad 23 comes into contact with a nose NS of the observer and supports the head-mounted display 10 with respect to the head H of the observer when the head-mounted display 10 is mounted on the head H of the observer.

The temple 22 is a straight temple with no angle for putting on an ear EA of the observer and a part of the temple 22 is configured to come into contact with the ear EA of the observer when the head-mounted display 10 is mounted on the head H of the observer. The image generation unit 3 and the expansion optical system 4 are accommodated inside the temple 22.

A material for forming the temple 22 is not particularly limited. For example, any of various resin materials, a composite material in which a carbon fiber, a glass fiber, or the like is mixed in a resin, or a metal material such as aluminum or magnesium can be used.

The shape of the frame 2 is not limited to the shape as long as the frame 2 can be mounted on the head H of the observer.

Image Display Device

As described above, the image display device 1 includes the image generation unit 3, the expansion optical system 4, and the reflection unit 6.

Hereinafter, the units of the image display device 1 according to the embodiment will be described in detail.

Image Generation Unit

As illustrated in FIG. 2, the image generation unit 3 is built in the temple 22 of the frame 2 described above.

As illustrated in FIGS. 3 and 4, the image generation unit 3 includes a video light generation unit 31, a driving signal generation unit 32, a control unit 33, a lens 34, a light diffraction unit 35, and a light scanning unit 36.

The image generation unit 3 has a function of generating a video light modulated based on a video signal and a function of generating a driving signal to drive the light scanning unit 36.

Hereafter, the units of the image generation unit 3 will be described in detail.

Video Light Generation Unit

The video light generation unit 31 generates video light L1 to be scanned (subjected to light-scanning) by the light scanning unit 36 (light scanner).

The video light generation unit 31 includes a light source unit 311 including a plurality of light sources (light source units) 311R, 311G, and 311B with different wavelengths, a plurality of driving circuits 312R, 312G, and 312B, and a light combination unit (combination unit) 313.

The light source 311R (R light source) included in the light source unit 311 emits red light, the light source 311G (G light source) emits green light, and the light source 311B emits blue light. A full-color image can be displayed using such three pieces of color light.

The light sources 311R, 311G, and 311B are not particularly limited. For example, laser diodes or LEDs can be used.

The light sources 311R, 311G, and 311B are electrically connected to the driving circuits 312R, 312G, and 312B, respectively.

The driving circuit 312R has a function of driving the above-described light source 311R, the driving circuit 312G has a function of driving the above-described light source 311G, and the driving circuit 312B has a function of driving the above-described light source 311B.

The three pieces (three colors) of light (video light) emitted from the light sources 311R, 311G, and 311B driven by the driving circuits 312R, 312G, and 312B are incident on the light combination unit 313.

The light combination unit 313 combines the pieces of light from the plurality of light sources 311R, 311G, and 311B.

In the embodiment, the light combination unit 313 includes two dichroic mirrors 313a and 313b.

The dichroic mirror 313a has a function of transmitting the red light and reflecting the green light. The dichroic mirror 313b has a function of transmitting the red light and the green light and reflecting the blue light.

By using the dichroic mirrors 313a and 313b, the three pieces of light, the red light, the green light, and the blue light from the light sources 311R, 311G, and 311B are combined to form one piece of video light L1.

Here, in the embodiment, the above-described light source unit 311 is disposed so that the light path lengths of the red light, the green light, and the blue light from the light sources 311R, 311G, and 311B are mutually the same.

The light combination unit 313 is not limited to the configuration in which the above-described dichroic mirrors are used. For example, the light combination unit 313 may be configured by a prism, a light-guiding path, an optical fiber, or the like.

In the video light generation unit 31 with the above-described configuration, the three color pieces of video light are generated in the light source unit 311 and the pieces of video light are combined in the light combination unit 313 so that one piece of video light L1 is generated. The video light L1 generated in the video light generation unit 31 is emitted toward the lens 34.

The above-described video light generation unit 31 may include, for example, a light detection unit (not illustrated) that detects the intensity or the like of the video light L1 generated by the light sources 311R, 311G, and 311B. By providing the light detection unit, it is possible to adjust the intensity of the video light L1 according to a detection result.

Lens

The video light L1 generated by the video light generation unit 31 is incident on the lens 34.

The lens 34 has a function of controlling a radiation angle of the video light L1. The lens 34 is, for example, a collimator lens. The collimator lens is a lens that adjusts (modulates) light to a light flux of a parallel state.

In the lens 34, the video light L1 emitted from the video light generation unit 31 is transmitted in the parallel state to the light diffraction unit 35 (light scanning unit 36) to be described below.

Driving Signal Generation Unit

The driving signal generation unit 32 generates a driving signal to drive the light scanning unit 36 (light scanner).

The driving signal generation unit 32 includes a driving circuit 321 that generates a first driving signal used for main scanning (horizontal scanning) in a first direction of the light scanning unit 36 and a driving circuit 322 that generates a second driving signal used for sub-scanning (vertical scanning) in a second direction orthogonal to the first direction of the light scanning unit 36.

For example, the driving circuit 321 generates the first driving signal V1 (horizontal scanning voltage) that periodically varies at a period T1, as illustrated in FIG. 5A. The driving circuit 322 generates the second driving signal V2 (vertical scanning voltage) that periodically varies at a period T2 different from the period T1, as illustrated in FIG. 5B.

The first and second driving signals will be described below in detail along with description of the light scanning unit 36 to be described below.

The driving signal generation unit 32 is electrically connected to the light scanning unit 36 via a signal line (not illustrated). Accordingly, the driving signals (the first and second driving signals) generated by the driving signal generation unit 32 are input to the light scanning unit 36.

Control Unit

The driving circuits 312R, 312G, and 312B of the video light generation unit 31 and the driving circuits 321 and 322 of the driving signal generation unit 32, as described above, are electrically connected to the control unit 33. The control unit 33 has a function of controlling the driving of the driving circuits 312R, 312G, and 312B of the video light generation unit 31 and the driving circuits 321 and 322 of the driving signal generation unit 32 based on video signals (image signals).

Based on instructions of the control unit 33, the video light generation unit 31 generates the video light L1 modulated according to image information and the driving signal generation unit 32 generates a driving signal according to the image information.

Light Diffraction Unit

The video light L1 parallelized in the lens 34 is incident on the light diffraction unit (first diffraction optical element) 35.

The light diffraction unit 35 includes a diffraction optical element that diffracts the video light L1. The light diffraction unit 35 configures a light reflection unit 114 of the light scanning unit 36. Therefore, a diffraction optical element included in the light diffraction unit 35 functions as a reflective diffraction element. Accordingly, the video light L1 incident on the light diffraction unit 35 is reflected by the light diffraction unit 35 (light reflection unit 114) and mutually intensifies light at a specific diffraction angle decided for each wavelength. Accordingly, diffracted light with a relatively large intensity at the specific angle is generated.

In the embodiment, the light diffraction unit 35 is configured by a first hologram element 351 which is one diffraction grating. The first hologram element 351 is a semi-transmissive film that has properties diffracting light in a specific wavelength region and transmitting light in the other wavelength region in the video light L1 incident on the light diffraction unit 35.

By using the first hologram element 351 in the light reflection unit 114 of the light scanning unit 36 to be described below, it is possible to diffract and reflect the video light L1 in a specific wavelength band and guides the video light L1 to the expansion optical system 4.

As the diffraction grating included in the light diffraction unit 35, any diffraction grating may be used as long as the diffraction grating can be provided to overlap with a plate-shaped member 113 and function a reflective diffraction element. Besides the above-described hologram element (holographic grating), a surface release type diffraction grating (blazed grating) in which a groove having a cross section with a sawtooth shape is formed or a surface relief hologram element (blazed holographic grating) in which a hologram element and a surface relief type diffraction grating are combined may be used.

Of these elements, a surface blazed hologram element is preferably used when diffraction efficiency is considered to be important. This element can obtain particularly high diffraction efficiency by matching the wavelength (the wavelength of light with the highest diffraction efficiency) of diffracted light decided by an angle (blazed angle) of a surface forming a groove, the wavelength of diffracted light decided by an interference fringe pitch of a hologram element, and the wavelength of the video light L1.

The function of the light diffraction unit 35 will be described below in detail.

Light Scanning Unit

The video light L1 emitted from the video light generation unit 31 is incident on the light diffraction unit 35 (the light scanning unit 36) via the lens 34.

The light scanning unit 36 is a light scanner that two-dimensionally scans the video light L1 from the video light generation unit 31. A scanning light (video light) L2 is formed when the light scanning unit 36 scans the video light L1.

As illustrated in FIG. 6, the light scanning unit 36 includes a movable mirror 11, one pair of axis portions 12a and 12b (first axis portion), a frame body 13, two pairs of axis portions 14a, 14b, 14c, and 14d (second axis portion), and a support portion 15, and a permanent magnet 16, and a coil 17. In other words, the light scanning unit 36 has a so-called gimbal structure.

Here, the movable mirror 11 and the one pair of axis portions 12a and 12b configure a first vibration system that sways (reciprocates and rotates) around a Y1 axis (first axis). The movable mirror 11, the one pair of axis portions 12a and 12b, the frame body 13, the two pairs of axis portions 14a, 14b, 14c, and 14d, and the permanent magnet 16 configure a second vibration system that sways (reciprocates and rotates) around an X1 axis (second axis).

The light scanning unit 36 includes a signal superimposition unit 18 (see FIG. 7). The permanent magnet 16, the coil 17, the signal superimposition unit 18, and the driving signal generation unit 32 configure a driving unit that drives the above-described first and second vibration systems (that is, sways the movable mirror 11 around the X1 axis and the Y1 axis).

Hereinafter, the units of the light scanning unit 36 will be sequentially described in detail.

The movable mirror 11 includes a base portion 111 (movable portion) and a plate-shaped member 113 fixed to the base portion 111 via a spacer 112.

The light diffraction unit 35 described above as the light reflection unit 114 is provided on the upper surface (one surface) of the plate-shaped member 113.

As illustrated in FIG. 7, a light absorption unit 116 absorbing incident light may be provided between the light diffraction unit 35 and the plate-shaped member 113. In this case, the light absorption unit 116 absorbs light which is incident on the light diffraction unit 35 and may not be diffracted to prevent the light from becoming stray light.

In the embodiment, the plate-shaped member 113 is formed in a circular shape in a plan view. The shape of the plate-shaped member 113 in the plan view is not limited thereto. For example, a circular shape such as an elliptical shape or an oval shape, a tetragonal shape, or a polygonal shape such as a hexagonal shape may be used.

A hard layer 115 is provided on the lower surface (the other surface) of the plate-shaped member 113, as illustrated in FIG. 7.

The hard layer 115 is formed of a harder material than a material of the body of the plate-shaped member 113. Accordingly, it is possible to improve the rigidity of the plate-shaped member 113. Therefore, it is possible to prevent or suppress bending at the time of swaying of the plate-shaped member 113. By thinning the thickness of the plate-shaped member 113, it is possible to prevent the moment of inertia when the plate-shaped member 113 is swayed around the X1 axis and the Y1 axis.

The material of the hard layer 115 is not particularly limited as long as the material is a material harder than the material of the body of the plate-shaped member 113. For example, diamond, a carbon nitride film, crystal, sapphire, lithium tantalate, or potassium niobate can be used.

The hard layer 115 may be configured by a single layer or may be a laminate of a plurality of layers. The hard layer 115 is provided as necessary, and thus can be omitted.

The lower surface of the plate-shaped member 113 is fixed to the base portion 111 via the spacer 112. Accordingly, it is possible to sway the plate-shaped member 113 around the Y1 axis while preventing contact between the plate-shaped member 113, and the axis portions 12a and 12b, the frame body 13, the axis portions 14a, 14b, 14c, and 14d.

As illustrated in FIG. 6, the frame body 13 is formed in a frame shape and is provided to surround the base portion 111 of the movable mirror 11 described above. In other words, the base portion 111 of the movable mirror 11 is provided inside the frame body 13 formed in the frame shape.

The frame body 13 is supported by the support portion 15 via the axis portions 14a, 14b, 14c, and 14d. The base portion 111 of the movable mirror 11 is supported by the frame body 13 via the axis portions 12a and 12b.

The axis portions 12a and 12b connect the movable mirror 11 to the frame body 13 so that the movable mirror 11 can be rotated (sway) around the Y1 axis. The axis portions 14a, 14b, 14c, and 14d connect the frame body 13 to the support portion 15 so that the frame body 13 can be rotated (sway) around the X1 axis orthogonal to the Y1 axis.

The axis portions 12a and 12b are disposed to face each other via the base portion 111 of the movable mirror 11. The axis portions 12a and 12b form a longitudinal shape extending in the direction along the Y1 axis. One end of each of the axis portions 12a and 12b is connected to the base portion 111 and the other end thereof is connected to the frame body 13. The axis portions 12a and 12b are disposed so that each central axis matches the Y1 axis.

The axis portions 12a and 12b are twisted and deformed with the swaying of the movable mirror 11 around the Y1 axis.

The axis portions 14a and 14b and the axis portions 14c and 14d are disposed to face each other via (interleaving) the frame body 13. The axis portions 14a, 14b, 14c, and 14d form a longitudinal shape extending in the direction along the X1 axis. One end of each of the axis portions 14a, 14b, 14c, and 14d is connected to the frame body 13 and the other end thereof is connected to the support portion 15. The axis portions 14a and 14b are disposed to face each other via the X1 axis. Similarly, the axis portions 14c and 14d are disposed to face each other via the X1 axis.

For the axis portions 14a, 14b, 14c, and 14d, the entire axis portions 14a and 14b and the entire axis portions 14c and 14d are twisted and deformed with the swaying of the frame body 13 around the X1 axis.

In this way, by enabling the movable mirror 11 to be swayed around the Y1 axis and enabling the frame body 13 to be swayed around the X1 axis, it is possible to sway (reciprocate and rotate) the movable mirror 11 around the two axes, the X1 axis and the Y1 axis orthogonal to each other.

Although not illustrated, for example, an angle detection sensor such as a strain sensor is provided in at least one of the axis portions 12a and 12b and at least one of the axis portions 14a, 14b, 14c, and 14d. The angle detection sensor can detect angle information regarding the light scanning unit 36 and, more specifically, each swaying angle of the light reflection unit 114 around the X1 axis and the Y1 axis. The detection result is input to the control unit 33 via a cable (not illustrated).

The permanent magnet 16 is joined to the lower surface (the opposite surface to the plate-shaped member 113) of the above-described frame body 13.

In the embodiment, the permanent magnet 16 has a longitudinal shape (bar shape) and is disposed in a direction inclined to the X1 axis and the Y1 axis. The permanent magnet 16 is magnetized in the longitudinal direction. That is, the permanent magnet 16 is magnetized such that one end of the permanent magnet 16 serves as the S pole and the other end thereof serves as the N pole.

In the embodiment, the case in which one permanent magnet is provided in the frame body 13 has been exemplified, but the invention is not limited thereto. For example, two permanent magnets may be provided in the frame body 13. In this case, for example, two permanent magnets formed in a long shape may be provided in the frame body 13 so that the permanent magnets face each other and are parallel to each other via the base portion 111 in a plan view.

The coil 17 is provided immediately below the permanent magnet 16. That is, the coil 17 is provided to face the lower surface of the frame body 13. Accordingly, it is possible to operate a magnetic field generated from the coil 17 to the permanent magnet 16, and it is possible to rotate the movable mirror 11 around each of the two axes (the X1 axis and the Y1 axis) orthogonal to each other.

The coil 17 is electrically connected to the signal superimposition unit 18 (see FIG. 7).

When the signal superimposition unit 18 applies a voltage to the coil 17, a magnetic field with a magnetic flux orthogonal to the X1 axis and the Y1 axis is generated from the coil 17.

The signal superimposition unit 18 includes an adder (not illustrated) that superimposes the first driving signal V1 and the second driving signal V2 described above and applies the superimposed voltage to the coil 17.

The driving circuit 321 generates, for example, the first driving signal V1 (horizontal scanning voltage) that periodically varies at the period T1, as illustrated in FIG. 5A. That is, the driving circuit 321 generates the first driving signal V1 with a first frequency (1/T1).

The first driving signal V1 forms a waveform such as a sinusoidal wave. Therefore, the light scanning unit 36 can efficiently perform main scanning on the light. The waveform of the first driving signal V1 is not limited thereto.

The first frequency (1/T1) is not particularly limited as long as the first frequency is a frequency proper for horizontal scanning and is preferably 10 kHz to 40 kHz.

In the embodiment, the first frequency is set to be the same as a torsional resonant frequency (f1) of the first vibration system (torsional vibration system) configured to include the movable mirror 11 and the one pair of axis portions 12a and 12b. That is, the first vibration system is designed (manufactured) so that the torsional resonant frequency f1 is a frequency proper for the horizontal scanning. Accordingly, a rotational angle of the movable mirror 11 around the Y1 axis can be enlarged.

On the other hand, the driving circuit 322 generates, for example, the second driving signal V2 (vertical scanning voltage) that periodically varies at the period T2 different from the period T1, as illustrated in FIG. 5B. That is, the driving circuit 322 generates the second driving signal V2 with a second frequency (1/T2).

The second driving signal V2 forms a waveform such as a sawtooth wave. Therefore, the light scanning unit 36 can efficiently perform vertical scanning (sub-scanning) on the light. The waveform of the second driving signal V2 is not limited thereto.

In the embodiment, the frequency of the second driving signal V2 is adjusted so that the frequency is a different frequency from a torsional resonant frequency (resonant frequency) of the second vibration system (torsional vibration system) configured to include the movable mirror 11, the one pair of axis portions 12a and 12b, the frame body 13, the two pairs of axis portions 14a, 14b, 14c, and 14d, and the permanent magnet 16.

In a raster scanning scheme which is a video drawing scheme, the above-described vertical scanning is performed while performing the above-described horizontal scanning. At this time, the frequency of the horizontal scanning is set to be higher than the frequency of the vertical scanning. In general, in the raster scan scheme, scanning at a high frequency is referred to as main scanning and scanning at a low frequency is referred to as sub-scanning.

In the above-described light scanning unit 36, the movable mirror 11 including the light reflection unit 114 is swayed around each of the two axes orthogonal to each other, and thus the light scanning unit 36 can be miniaturized and become lightweight. As a result, the observer can more easily use the image display device 1.

In particular, since the light scanning unit 36 has the gimbal structure, it is possible to miniaturize the configuration (the light scanning unit 36) that scans the video light two-dimensionally.

Expansion Optical System

As illustrated in FIG. 3, the scanning light (video light) L2 scanned by the above-described light scanning unit 36 is transmitted to the expansion optical system 4.

The expansion optical system 4 has a function of expanding a light flux width of the video light L2 scanned by the light scanning unit 36, that is, expanding the cross-sectional area of the video light L2.

Any optical system can be used as the expansion optical system 4 as long as the optical system has such a function and the configuration is not particularly limited. As illustrated in FIG. 3, for example, the expansion optical system 4 according to the embodiment includes an optical element 5, a correction lens 42, and a light-shielding plate 43. The image display device 1 according to the embodiment includes such an expansion optical system 4, but this function may be omitted when this function is not necessary.

Hereinafter, the units of the expansion optical system 4 will be sequentially described in detail.

Optical Element

As illustrated in FIG. 3, the optical element 5 is provided near the light scanning unit 36, has light transparency (light transmissive property), and has a long shape along the Z axis direction.

The video light L2 scanned by the above-described light scanning unit 36 is incident on the optical element 5.

The optical element 5 expands the light flux width (cross-sectional area) of the video light L2 scanned by the light scanning unit 36. Specifically, the optical element 5 expands the light flux width of the video light L2 by propagating the video light L2 scanned by the light scanning unit 36 in the Z direction while multiply reflecting the video light L2 inside the optical element 5 and emits pieces of video light L3 and L4 with the larger light flux width than the video light L2. Such an optical element 5 functions as a pupil expansion optical system.

As illustrated in FIGS. 8A to 8D, the optical element 5 has an incident surface 56 at one end in the longitudinal direction (the Z axis direction) and an emission surface 57 at the other end. These surfaces (the incident surface 56 and the emission surface 57) face each other. The optical element 5 has side surfaces 58a and 58b facing each other in the thickness direction (the X axis direction) and side surfaces 59a and 59b facing in the width direction (the Y axis direction).

The incident surface 56 is provided to confront the light scanning unit 36 and the emission surface 57 is provided to confront the correction lens 42 and the light-shielding plate 43 (see FIG. 3).

The incident surface 56 is a surface that has light transparency and is a surface on which the video light L2 scanned by the light scanning unit 36 is incident. On the other hand, the emission surface 57 is a surface that has light transparency and is a surface from which the video light L2 incident from the incident surface 56 is emitted as the pieces of video light L3 and L4.

The side surfaces 58a and 58b are total reflection surfaces and totally reflect the video light L2 incident inside the optical element 5. Here, the total reflection surfaces include not only surfaces with light transmittance of 0% but also surfaces that slightly transmit light, for example, surfaces with light transmittance less than 3%.

The side surfaces 59a and 59b may be surfaces with any light transmittance. For example, the side surfaces 59a and 59b may be total reflection surfaces or semi-reflection surfaces, but are preferably surfaces with relatively low light transmittance. Accordingly, it is possible to prevent the light inside the optical element 5 from becoming stray light. As a method of preventing the light inside the optical element 5 from becoming stray light, for example, a method of roughening the side surfaces 59a and 59b.

As illustrated in FIGS. 8A to 8D, the incident surface 56 and the emission surface 57 are parallel to each other. The side surfaces 58a and 58b are parallel to each other. The side surfaces 59a and 59b are parallel to each other. Therefore, in the embodiment, the entire shape of the optical element 5 is rectangular parallelepiped.

The foregoing "parallelism" includes not only complete parallelism but also parallelism in which an angle formed by the surfaces is ±2°.

In the embodiment, the incident surface 56 and the emission surface 57 are parallel to each other. However, the incident surface 56 and the emission surface 57 may not be parallel to each other and the absolute values of inclination angles may be the same. The fact that "the absolute values of the inclination angles of the incident surface 56 and the emission surface 57 are the same" includes, for example, a state in which the incident surface 56 is inclined at an acute angle α (for example, +20°) in the +Z axis direction with respect to the XY plane and the emission surface 57 is inclined at the acute angle α (for example, −20°) in the −Z axis direction with respect to the XY plane.

In the embodiment, the side surfaces 59a and 59b are parallel to each other. However, the side surfaces 59a and 59b may not be parallel to each other or inclination angles may be different.

As illustrated in FIGS. 8A to 8D, the optical element 5 having such a configuration includes light-guiding units 51, 52, and 53 that guide the video light L2 and half mirror layers 54 and 55.

The optical element 5 is configured such that the light-guiding unit 51, the half mirror layer 54, the light-guiding unit 52, the half mirror layer 55, and the light-guiding unit 53 are stacked in this order in the thickness direction (the X axis direction). That is, the optical element 5 is a one-dimensional array in which the light-guiding units 51, 52, and 53 are arrayed in the thickness direction with the half mirror layers 54 and 55 interposed therebetween.

The light-guiding units 51, 52, and 53 are light pipes formed in a plate shape and have a function of propagating the video light L2 (the video light scanned by the light scanning unit 36) incident from the incident surface 56 in the +Z direction.

Figure 8:
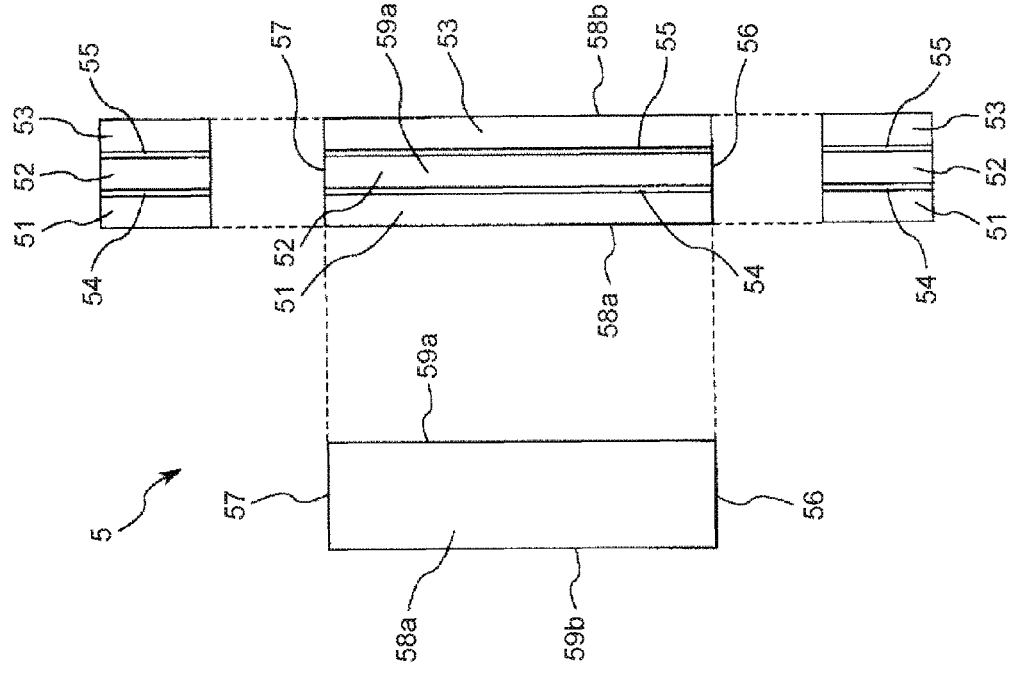
FIGS. 8A, 8B, 8C, and 8D are respectively a front view, a plan view, a right side view, and a left side view illustrating an overall configuration of a pupil expansion optical system illustrated in FIG. 3.
Figure 9:
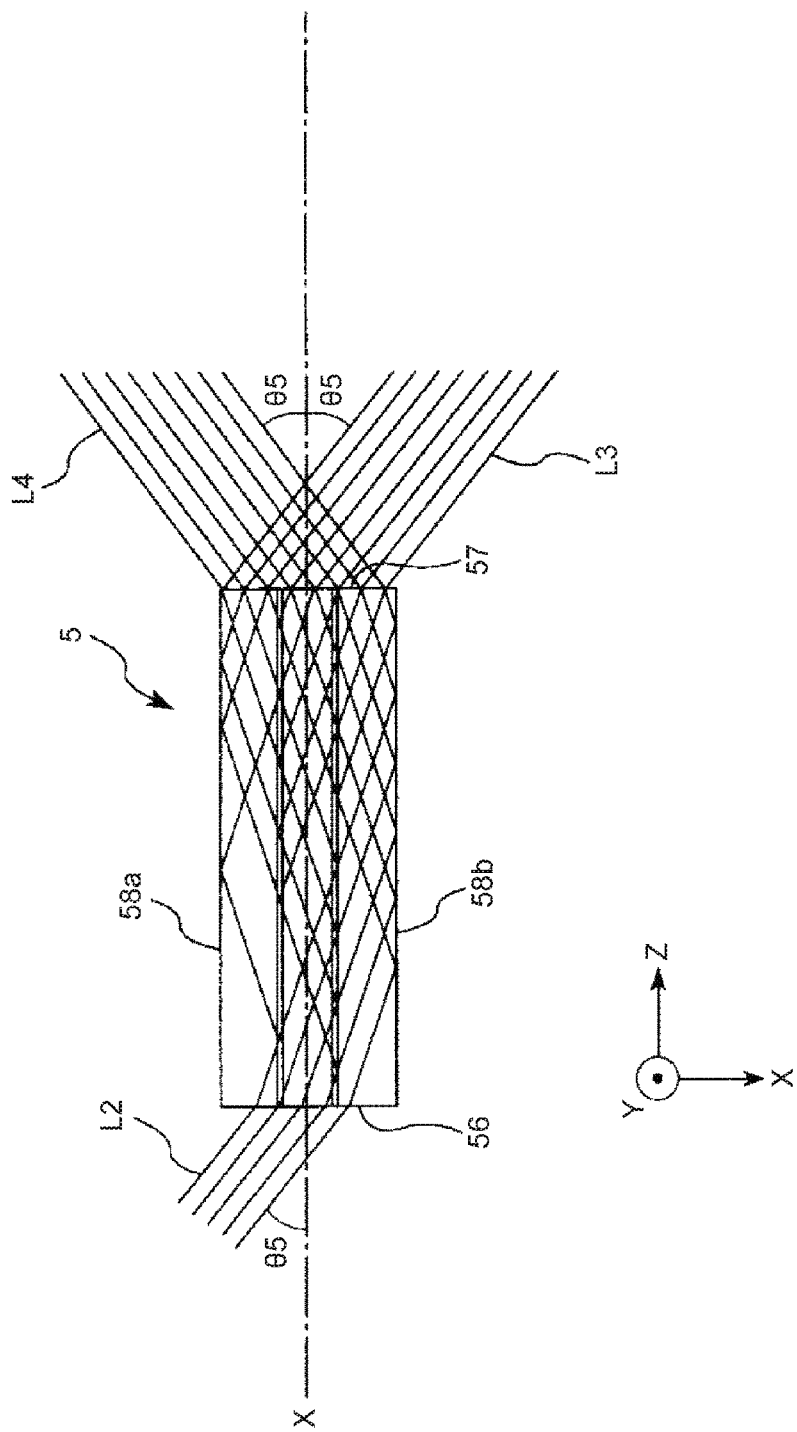
FIG. 9 is a diagram illustrating a path of video light incident on the pupil expansion optical system illustrated in FIGS. 8A to 8D.

As illustrated in FIGS. 8A and 8B, the cross-sectional shapes (the cross-sectional shapes on the XY plane) of the light-guiding units 51, 52, and 53 have a rectangular shape. The cross-sectional shapes (the cross-sectional shapes on the XY plane) of the light-guiding units 51, 52, and 53 are not limited thereto, but may have a tetragonal shape such as a square shape or another polygonal shape.

The light-guiding units 51, 52, and 53 may have light transparency and are formed of, for example, any of various resin materials such as an acrylic resin or a poly carbonate resin or any of various kinds of glass.

The half mirror layers 54 and 55 are formed of, for example, a reflection film having light transparency, that is, a semi-transflective film. The half mirror layers 54 and 55 have a function of reflecting a part of the video light L2 and transmitting a part of the video light L2. The half mirror layers 54 and 55 are formed of a semi-transflective film such as a metal reflection film of sliver (Ag), aluminum (Al), or the like or a dielectric multi-layer film.

The optical element 5 having such a configuration can be obtained, for example, by performing surfactant bonding on the light-guiding units 51, 52, and 53 in which thin films serving as the half mirror layers 54 and 55 are formed on the main surfaces. By manufacturing the optical element 5 by the surfactant bonding, it is possible to improve the degree of parallelism of the units (the light-guiding units 51, 52, and 53).

In the optical element 5 having the above-described configuration, as illustrated in FIG. 9, the video light L2 scanned by the light scanning unit 36 is incident from the incident surface 56, is multiply reflected inside the optical element 5, and is emitted as the pieces of video light L3 and L4 in the state of the expanded light flex width from the emission surface 57. In this way, the light flux width (the cross-sectional area) of the video light L2 can be expanded in the optical element 5.

Here, by parallelizing the incident surface 56 and the emission surface 57, the amount of refraction of the video light L2 incident on the incident surface 56 can be the same as the amount of refraction of the pieces of video light L3 and L4 emitted from the emission surface 57. That is, an angle θ5 at which the video light L2 is incident with respect to the half mirror layers 54 and 55 can be the same as angles θ5 at which the pieces of video light L3 and L4 are emitted with respect to the half mirror layers 54 and 55. Accordingly, it is possible to prevent distortion caused by a trigonometric function of the rule of refraction or occurrence of chromatic aberration caused by wavelength dispersion of the refractive index of the material.

The optical element 5 according to the embodiment is a one-dimensional array (first one-dimensional array) in which the light-guiding units 51, 52, and 53 are arrayed in the thickness direction. In this way, in the relatively simple configuration in which the light-guiding units 51, 52, and 53 are mutually stacked, the video light L2 incident from the incident surface 56 is multiply reflected inside the optical element 5. Therefore, without using a position detection unit or the like matching the video light with a visual line of the observer or the positions of the right and left eyes EY of the observer, the light flux width of the video light L2 can be expanded in the relatively simple configuration according to the embodiment.

As illustrated in FIG. 3, the optical element 5 is disposed so that principal rays of the pieces of video light L3 and L4 are emitted from the reflection unit 6 in an in-plane direction (XY in-plane direction) including an axis line W (see FIG. 1) parallel to a direction (the X axis direction) in which the left eye EY and the right eye EY of the observer are arranged when the head-mounted display is mounted on the head H of the observer. In other words, the optical element 5 is disposed so that the cross-sectional area of the video light L3 is expanded in the direction of the axis line W. The correction lens 42 and the light-shielding plate 43 are arranged along the axis line W. Therefore, the video light L3 emitted from the emission surface 57 is emitted toward the reflection unit 6 via the correction lens 42 and the video light L4 emitted from the emission surface 57 is emitted toward the light-shielding plate 43. In this way, by disposing the optical element 5 so that the cross-sectional area of the video light L3 in the direction of the axis line W is expanded, it is possible to expand the video light L3 guided to the eye of the observer via the correction lens 42 and the reflection unit 6 in the right and left directions of the eye. Accordingly, it is possible to improve visibility in the right and left directions in which a movement range is larger than the upper and lower directions of the eye.

Correction Lens

As illustrated in FIG. 3, the video light L3 emitted from the optical element 5 is incident on the correction lens 42.

The correction lens 42 has a function of correcting disturbance of the parallelism of the video light L3 by an aspheric mirror 61 included in the reflection unit 6 to be described below. Accordingly, it is possible to improve the resolution performance of the video light L3. Examples of the correction lens 42 include a toroidal lens, a cylindrical lens, and a free curved lens.

Light-Shielding Plate

The video light L4 emitted from the optical element 5 is incident on the light-shielding plate 43.

The light-shielding plate 43 is configured to include a light absorption member that absorbs light and is a light-shielding unit that shields light. Accordingly, the video light L4 emitted from the optical element 5 is shielded as unnecessary light.

Such a light-shielding plate 43 is formed of, for example, a stainless steel or an aluminum alloy.

In the embodiment, the light-shielding plate 43 is used as the light-shielding unit that shields the video light L4. However, the light-shielding unit that shields the video light L4 is not limited thereto. The video light L4 may be prevented from becoming stray light. For example, the light-shielding plate 43 may not be used as the light-shielding unit, but the light-shielding unit may have a configuration in which the video light L4 is shielded by applying a paint or the like to the circumference of the frame 2.

The video light L3 of which the light flux width is expanded by the expansion optical system 4 with the above-described configuration is incident on the reflection unit 6 via the correction lens 42, as illustrated in FIG. 3.

Reflection Unit

The reflection unit 6 is provided in the shade portion 212 of the front unit 21 and is disposed to be located in front of the left eye EY of the observer at the time of use. The reflection unit 6 has a sufficient size to cover the eye EY of the observer and has a function of causing the video light L3 from the optical element 5 to be incident toward the eye EY of the observer.

The reflection unit 6 includes the aspheric mirror 61 including a light diffraction unit (the second diffraction optical element) 65.

The aspheric mirror 61 is a light transparent member in which a semi-transflective film is manufactured on a substrate formed of a resin material with light transparency (light transmissive property) of a high visible range. That is, the aspheric mirror 61 is a half mirror and has a function of transmitting outside light (light transparency with respect to the visible light). Accordingly, the reflection unit 6 including the aspheric mirror 61 has a function of reflecting the video light L3 emitted from the optical element 5 and transmitting the outside light traveling toward the eye EY of the observer from the outside of the reflection unit 6 at the time of use. Accordingly, the observer can view a virtual image (image) formed by the video light L5 while viewing an outside image. That is, the see-through head-mounted display can be realized.

Such an aspheric mirror 61 is formed in a shape curved along the curve of the front unit 21 of the frame 2 and a concave surface 611 is located on the side of the observer at the time of use. Accordingly, the video light L5 reflected by the aspheric mirror 61 can efficiently be condensed toward the eye EY of the observer.

The light diffraction unit 65 is provided on the concave surface 611. The light diffraction unit 65 has a function of deflecting the video light L3 emitted from the emission surface 57 of the optical element 5 in the direction of the eye EY of the observer by diffraction. That is, the light diffraction unit 65 includes a diffraction optical element that diffracts the video light L3. Since the diffraction optical element is a reflective diffraction element, the video light L3 incident on the light diffraction unit 65 is reflected and the light is mutually intensified at a specific angle decided for each wavelength. Accordingly, the diffracted light with a relatively great intensity is generated at a specific diffraction angle.

In the embodiment, the light diffraction unit 65 is configured to include a second hologram element 651 which is one diffraction grating. The second hologram element 651 is a semi-transmissive film that has properties diffracting light in a specific wavelength region and transmitting light in the other wavelength region in the video light L3 radiated from the optical element 5 to the second hologram element 651.

By using such a second hologram element 651, the angle or the light flux state of the video light guiding to the eye of the observer can be adjusted by diffraction in the video light in the specific wavelength band, and thus the virtual image can be formed in front of the eye. Specifically, the video light L3 reflected by the aspheric mirror 61 is emitted to the outside and is incident as the video light L5 to the left eye EY of the observer by the second hologram element 651. The same also applies to the reflection unit 6 located on the side of the right eye EY. The video light L5 incident on each of the right and left eyes EY of the observer is formed as an image on the retina of the observer. Accordingly, the observer can observe the virtual image (image) formed by the video light L3 emitted from the optical element 5 in a visual field range.

Any diffraction element may be used as the diffraction grating included in the light diffraction unit 65 as long as the diffraction element is a reflective diffraction element. Besides the above-described hologram element (holographic grating), a surface release type diffraction grating (blazed grating) in which a groove having a cross section with a sawtooth shape is formed or a surface relief hologram element (blazed holographic grating) in which a hologram element and a surface relief type diffraction grating are combined may be used.

In the above-described image display device 1, the video light L1 generated by the image generation unit 3 is expanded by the expansion optical system 4 and is guided to the eye EY of the observer in the reflection unit 6, so that the observer can recognize the video light generated by the image generation unit 3 as a virtual image formed in a visual field range of the observer.

Operation of Image Display Device

Figure 10:
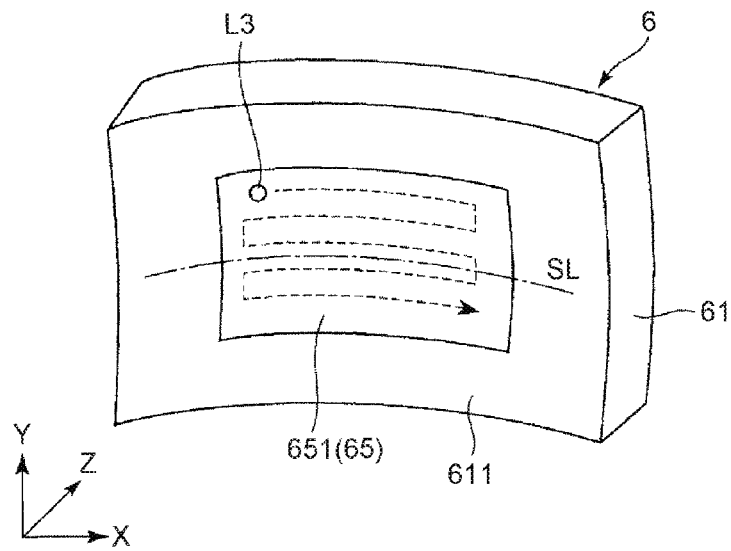
FIG. 10 is a diagram illustrating an example of a form of the video light when the video light scanned by the light scanning unit is projected to a reflection unit and is scanned two-dimensionally.

FIG. 10 is a diagram illustrating an example of a form of the video light when the video light scanned by the light scanning unit is projected to a reflection unit and is scanned two-dimensionally.

In the example illustrated in FIG. 10, the video light L3 canned by the light scanning unit 36 and expanded in the expansion optical system 4 is projected inside the rectangular second hologram element 651 (the light diffraction unit 65) of the aspheric mirror 61 of the reflection unit 6.

The video light L3 draws any video inside the second hologram element 651 by combining the main scanning in the horizontal direction (the right and left directions of FIG. 10) and the sub-scanning in the vertical direction (the upper and lower directions of FIG. 10). A scanning pattern of the video light L3 is not particularly limited. In a pattern example indicated by a dotted line arrow in FIG. 10, motions of performing the main scanning in the horizontal direction, subsequently performing the sub-scanning in the vertical direction at an end and performing the main scanning in the opposite direction to the horizontal direction, and subsequently performing the sub-scanning in the vertical direction at an end are repeated.

Figure 11:
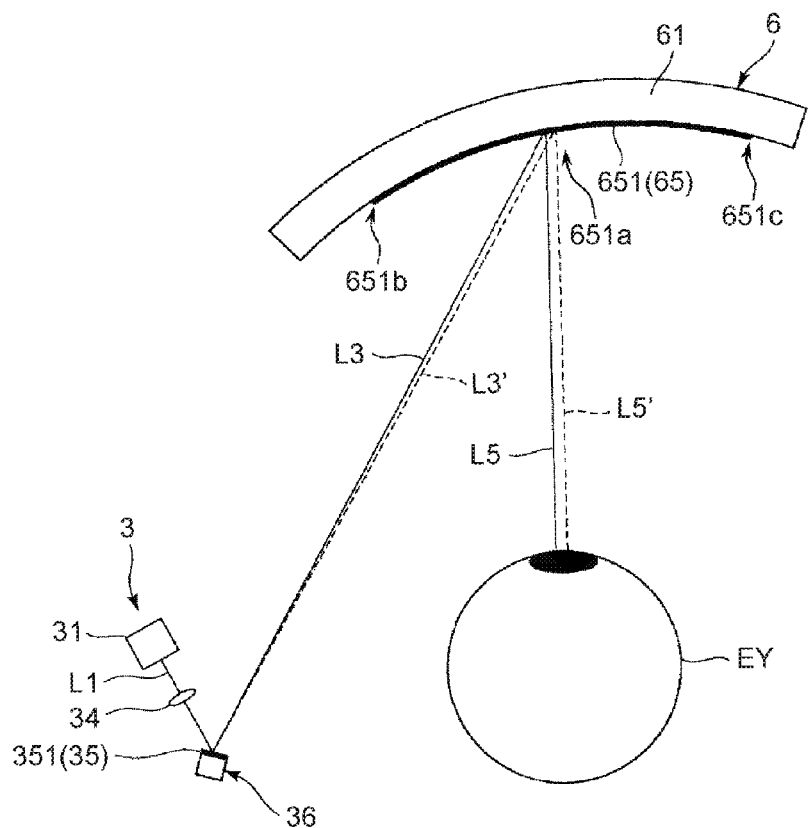
FIG. 11 is a diagram illustrating an operation of the image display device illustrated in FIG. 3.

FIG. 11 is a diagram illustrating an operation of the image display device illustrated in FIG. 3. In FIG. 11, the expansion optical system 4 and the like are not illustrated.

A diffraction angle in the light diffraction unit 65 depends on the wavelength of the video light L3 incident on the light diffraction unit 65. When the video light L3 has only completely monochromatic light, that is, light with a specific wavelength, the diffraction angle of the video light L3 is normally constant and the emission direction of the video light L5 incident on the eye EY of the observer is also normally constant. Therefore, the observer can view a clear image with no blur or smear without deviation in the position of the virtual image recognized by the observer.

However, it is not easy to cause the video light L3 to have the completely monochromatic light, in other words, to cause the video light L1 incident on the light diffraction unit 35 in FIG. 3 to have the completely monochromatic light. Further, a wavelength width of, for example, a few of nm is contained although the wavelength width differs depending on a kind of the light source unit 311. In particular, this tendency is prominent when a semiconductor laser of a vertical multi-mode is used as a light source. In a configuration of the related art in which the light diffraction unit 35 is not included, the video light L1 with such a wavelength width is incident on the light diffraction unit 65 and is diffracted, and a predetermined angle width occurs even at a diffraction angle according to a wavelength width of, for example, a few of nm. As a result, the video light L5 has this angle width and is incident as the video light L5 on the eye EY of the observer. Since an angle deviation affects a position deviation in the retina of the observer more considerably than deviation in the position at which the video light is incident on the eye EY of the observer, a large position deviation corresponding to several pixels to several tens of pixels occurs in the retina of the observer in the configuration of the related art.

As an example of a calculation result of the position deviation, when the light incident on the light diffraction unit 65 is green light and the wavelength of the green light deviates by 1 nm (when a wavelength width occurs), a position deviation corresponding to 3.4 pixels on the retina accordingly occurs. When the light incident on the light diffraction unit 65 is blue light and the wavelength of the blue light deviates by 1 nm (when a wavelength width occurs), a position deviation corresponding to 3.9 pixels on the retina accordingly occurs. When the light incident on the light diffraction unit 65 is red light and the wavelength of the red light deviates by 1 nm (when a wavelength width occurs), a position deviation corresponding to 2.7 pixels on the retina accordingly occurs. The position deviation of such a virtual image results in a deterioration in the resolution of a video recognized by the observer. In other words, the image quality of the video decreases.

When the temperature of the light source unit 311 changes with a change in environment temperature, the wavelength of the output light changes in accordance with the temperature characteristics of the light source unit 311. Accordingly, when the wavelength of the video light L3 changes, the diffraction angle changes in the light diffraction unit 65 and a position at which the video light L5 is formed as an image may be accordingly deviated. At this time, when the temperature characteristics are mutually the same in the light source 311R emitting the red light, the light source 311G emitting the green light, and the light source 311B emitting the blue light, the deviations in the positions of the three pieces of color light formed as the image are also the same. Therefore, movement (shift) of a video occurs, but a color deviation does not occur.

However, the temperature characteristics are generally different in the light sources 311R, 311G, and 311B. In this case, when the environment temperature is changed, a difference in a change width of the wavelength occurs for each color of the light. As a result, in the configuration of the related art, for example, the position of the formed image differs in the video light L5 of the red, the video light L5 of the green, and the video light L5 of the blue, and thus a so-called color deviation occurs in addition to the shift of the video.

Further, when the outputs of the light sources 311R, 311G, and 311B are changed to modulate the intensity of the video light L5 (directly modulated), the wavelength of the output light changes with a change in a driving current in some cases. When the wavelength changes, the wavelength of the video light L3 changes based on an intensity modulation signal, and thus the diffraction angle in the light diffraction unit 65 also changes over time based on the intensity modulation signal. As a result, in the configuration of the related art, whenever the intensity of the video light L5 is modulated, a position at which the video light L5 is formed as an image may be deviated, thereby resulting in the deterioration in the resolution of the video viewed by the observer.

To resolve such a problem, in the embodiment, the light diffraction unit 35 is provided to overlap with the light reflection unit 114 of the light scanning unit 36. When the light is incident on the light diffraction unit 35, an angle width is accompanied at a diffraction angle based on the wavelength width of the incident light (the video light L1), as in the light diffraction unit 65. For example, when the wavelength width of a few of nm is present in the video light L1, the diffraction angle of the light emitted from the light diffraction unit 35 is decided based on the shape of the first hologram element 351 included in the light diffraction unit 35 or the wavelength of the video light L1, and thus a predetermined angle width corresponding to the wavelength width is accompanied. In the example illustrated in FIG. 11, the video light L1 is diffracted in the light diffraction unit 35, and thus the video light L3 and video light L3' are formed as examples of the video light propagating to extend at a predetermined angle. In the following description, to facilitate the description, diffraction of the video light L1 in the light diffraction unit 35 is referred to as "first diffraction".

The video light L3 and the video light L3' accompanying a predetermined angle width in such first diffraction are incident on the reflection unit 6 via the light scanning unit 36 and the expansion optical system 4. Then, as described above, diffraction occurs again in the video light L3 and the video light L3' incident on the light diffraction unit 65 provided in the reflection unit 6. In the following description, to facilitate the description, diffraction of the video light L3 and the video light L3' in the light diffraction unit 65 is referred to as "second diffraction".

In the second diffraction, a predetermined angle width corresponding to the wavelength width is also accompanied since the diffraction angle of the light emitted from the light diffraction unit 65 is decided based on the shape of the second hologram element 651 included in the light diffraction unit 65 and the wavelengths of the video light L3 and the video light L3'.

Here, in the second diffraction, the diffraction occurs so that the angle width of the diffraction angles occurring in the first diffraction is offset (corrected). As a result, the angle widths of the diffraction angles of the video light L3 and the video light L3' emitted from the light diffraction unit 65 are suppressed to be small. Accordingly, it is possible to suppress the deviation in the image formation positions of the video light L5 and the video light L5' on the retina of the observer to be small. That is, when there is no second diffraction, the video light L3 and the video light L3' continuously extend at predetermined angles, and thus are incident on the eye with a angle difference. Therefore, the resolution may deteriorate on the retina. However, since at least part of the angle width occurring in the first diffraction is offset in the second diffraction, the angle difference between the video light L5 which is the diffracted light of the video light L3 and the video light L5' which is the diffracted light of the video light "L3' sufficiently decreases (that is, the video light L5 and the video light L5' approach each other in parallel), as illustrated in FIG. 11, and thus the difference in the image formation position in the retina of the observer sufficiently decreases. As a result, it is possible to suppress the deterioration in the resolution of the video.

Similarly, by undergoing the diffraction twice, at least part of the angle width of the diffraction angles occurring in the first diffraction is offset in the second diffraction even when the environment temperature changes and the wavelength of the light output from the light source unit 311 changes. Therefore, the angle width can be configured not to increase further. As a result, the angle width of the diffraction angles in the second diffraction can be suppressed to be small, and thus occurrence of the color deviation can be suppressed to be small.

Similarly, by undergoing the diffraction twice, at least part of the angle width of the diffraction angles occurring in the first diffraction can be offset in the second diffraction even when the light sources 311R, 311G, and 311B are directly modulated. As a result, the angle width of the diffraction angles in the second diffraction can be suppressed to be small. Accordingly, the deviation in the position at which the video light L5 is formed as the image on the retina of the observer can be suppressed to be small.

As described above, in the embodiment, even when the video light L1 accompanies the wavelength width, the change width of the wavelength differs for each color of the light, or the wavelength changes over time, an increase in the angle width of the diffraction angles due to the wavelength width, an increase in the change width of the diffraction angles over time or for each color due to the wavelength change is suppressed in the video light L5. Accordingly, the position at which the video light L5 is formed as the image is suppressed to, for example, the degree equal to or less than one pixel, the deterioration in the image quality is suppressed, and the deterioration in the image quality caused due to the color deviation is also suppressed.

To offset the angle width occurring between the diffraction angles in the first diffraction and the second diffraction as reliable as possible, a grating period of the diffraction grating used in the first diffraction and a grating period of the diffraction grating used in the second diffraction may approach each other as close as possible.

In the embodiment, the first hologram element 351 is used as the light diffraction unit 35 carrying out the first diffraction and the second hologram element 651 is used as the light diffraction unit 65 carrying out the second diffraction. Since diffraction occurs in the hologram element based on an interference fringe which is a diffraction grating recorded on the hologram element, the first hologram element 351 and the second hologram element 651 may be configured such that pitches of the distances of the interference fringes (diffraction grating periods) are as mutually close as possible. Even when a surface relief type diffraction grating is used in the first diffraction and the second hologram element 651 is used in the second diffraction, the grating pitch of the surface relief type diffraction grating and the interference fringe pitch of the second hologram element 651 may be configured to be mutually as close as possible. In the following description, the interference fringe will be mainly described, but the regulations of the interference fringe can also be applied to a diffraction grating structure such as a grating or a groove without change.

The first hologram element 351 may have portions in which the interference fringe pitches are mutually different. However, it is assumed that the interference fringe pitches are constant in the entire hologram element. Since it is easy to design and manufacture the first hologram element 351, it is possible to obtain the advantage of easily achieving high precision of the interference fringe pitches and realize low cost.

In the regulation of "constant interference fringe pitch" in this case, for example, a variation in the interference fringe pitch caused in a manufacturing process is allowed.

The interference fringe pitch (the diffraction grating period) of the first hologram element 351 refers to a pitch obtained on a line drawn to pass through a point to which the video light L1 is projected and to be orthogonal to the interference fringe in the first hologram element 351.

In contrast, the second hologram element 651 preferably has portions in which the interference fringe pitches are mutually different. Specifically, since diffraction angles at which the video light L3 is diffracted to be incident on the eye EY of the observer are mutually different, for example, among a central portion 651a, an end portion 651b on the side of the image generation unit 3, and an end portion 651c on the opposite side to the image generation unit 3 in the second hologram element 651 illustrated in FIG. 11, it is preferable that the interference fringe pitches are accordingly different from each other. Accordingly, it is possible to diffract the video light L3 projected to the second hologram element 651 while scanned two-dimensionally so that the video light L3 is incident on the eye EY of the observer. As a result, the observer can view a video with a large angle of view and high quality.

As an example in which the second hologram element 651 includes the portions in which the interference fringe pitches are mutually different, a case in which the interference fringe pitches of the end portion 651b are relatively sparser than the central portion 651a and the interference fringe pitches of the end portion 651c are relatively denser than the central portion 651a can be exemplified. In this way, the following advantages can be obtained. When the interference fringe pitches are different partially in this way, the interference fringe pitches are preferably configured to continuously vary. Accordingly, it is possible to suppress the deterioration in the resolution occurring when the interference fringe pitches discontinuously vary.

However, by providing the portions in which the interference fringe pitches are mutually different in the second hologram element 651, there is a concern that the difference in the interference fringe pitches of the first hologram element 351 increases in some portions. When the difference in the interference fringe pitches of the first hologram element 351 increases, as described above, there is a concern that the angle width or the angle change of the diffraction angles occurring in the first diffraction may not be sufficiently offset in the second diffraction.

In consideration of these facts, the interference fringe pitches of the first hologram element 351 are preferably set to be equal to or less than twice of the maximum value of the interference fringe pitches of the second hologram element 651 and to be equal to or greater than half of the minimum value. When the interference fringe pitches are set in this way, the function of offsetting, in the second diffraction, the angle width or the angle change of the diffraction angles occurring in the first diffraction may not be said to be sufficient. However, occurrence of the deterioration in the resolution or the color deviation can be suppressed further than when the first hologram element 351 is not provided.

More preferably, the interference fringe pitches of the first hologram element 351 are set to be between the maximum value and the minimum value of the interference fringe pitches of the second hologram element 651. In such setting, a difference between the interference fringe pitches of the first hologram element 351 and the second hologram element 651 can be sufficiently small in the substantially entire region of the second hologram element 651 even when there is the difference in the interference fringe pitches in the second hologram element 651. Therefore, in the substantially entire region of the second hologram element 651, the angle width or the angle change of the diffraction angles occurring in the first diffraction can be sufficiently offset.

In contrast, the interference fringe pitches of the first hologram element 351 are preferably set to be the same as the interference fringe pitches in the central portion 651a of the second hologram element 651. Accordingly, for example, when the interference fringe pitches of the second hologram element 651 are distributed with a constant width focusing on the interference fringe pitches in the central portion 651a, the angle width or the angle change of the diffraction angles occurring in the first diffraction can be more sufficiently offset in the substantially entire region of the second hologram element 651.

Further, in the second hologram element 651 in which the interference fringe pitches are set in this way, the angle width or the angle change of the diffraction angles in the central portion 651a is relatively most easily offset and the deterioration in the resolution or the color deviation in the video light L5 diffracted and reflected in the central portion 651a is suppressed relatively most. The video light L5 diffracted and reflected in the central portion 651a is generally considered to be light that contains information of relatively high importance in the video and is easily viewed unconsciously by the eye EY of the observer. Accordingly, the deterioration in the resolution or the color deviation in the video light L5 diffracted and reflected in the central portion 651a is sufficiently suppressed, and thus the video with high quality can be viewed.

The interference fringe pitch (the diffraction grating period) of the second hologram element 651 refers to a value obtained in a scanning line SL that passes through the center of the amplitude of the sub-scanning in the vertical direction (the upper and lower directions of FIG. 10) and is formed in the main scanning in the horizontal direction (the right and left directions of FIG. 10) in the scanning range of the video light L3 (corresponding to the scanning range of the video light L3 in the second hologram element 651 in the embodiment).

The central portion 651a of the second hologram element 651 refers to a position which is the center of the amplitude of the sub-scanning in the vertical direction and the center of the amplitude of the main scanning in the horizontal direction in the scanning range of the video light L3 (corresponding to the scanning range of the video light L3 in the second hologram element 651 in the embodiment).

In contrast, the interference fringe pitches of the first hologram element 351 may be set to be the same as an average value of the interference fringe pitches of the second hologram element 651. In such setting, a difference between the interference fringe pitches of the first hologram element 351 and the second hologram element 651 can be sufficiently small in the substantially entire region of the second hologram element 651 even when there is the difference in the interference fringe pitches in the second hologram element 651. Therefore, in the substantially entire region of the second hologram element 651, the angle width or the angle change of the diffraction angles occurring in the first diffraction can be more sufficiently offset.

As described above, the interference fringe pitches of the first hologram element 351 are regulated based on the magnitude relation with the interference fringe pitches of the second hologram element 651. However, in contrast to this, the interference fringe pitches of the second hologram element 651 may be regulated based on the interference fringe pitches of the first hologram element 351.

For example, the interference fringe pitch of the second hologram element 651 is preferably set to be included within a range equal to or greater than 70% and equal to or less than 130% of the interference fringe pitch of the first hologram element 351 and is more preferably set to be included within a range equal to or greater than 90% and equal to or less than 110% of the interference fringe pitch of the first hologram element 351. When the interference fringe pitch of the second hologram element 651 is included within this range, the interference fringe pitch of the second hologram element 651 is entered within a relatively narrow range focusing on the interference fringe pitch of the central portion 651*a*. Accordingly, the angle width or the angle change of the diffraction angles occurring in the first diffraction can be particularly sufficiently offset in the substantially entire region of the second hologram element 651.

As a specific example, when green light with a wavelength of 515 nm is diffracted and the density of the interference fringes of the first hologram element 351 is 1550 per mm, the density of the interference fringes of the central portion 651*a* of the second hologram element 651 is preferably 1550 per mm, and the densities of the interference fringes of the end portions 651*b* and 651*c* of the second hologram element 651 are preferably equal to or greater than 1085 and equal to or less than 2015 per mm and are more preferably equal to or greater than 1395 and equal to or less than 1705 per mm.

In this case, further more preferably, the densities of the interference fringes of the end portions 651*b* and 651*c* of the second hologram element 651 are considered to be equal to or greater than 1490 and equal to or less than 1700 per mm.

On the other hand, when blue light with a wavelength of 450 nm is diffracted, the density of the interference fringes of the first hologram element 351 is 1790 per mm and the above-described densities of the interference fringes of the second hologram element 651 may be accordingly decided as described above.

Further, when red right with a wavelength of 630 nm is diffracted, the density of the interference fringes of the first hologram element 351 is 1270 per mm and the above-described densities of the interference fringes of the second hologram element 651 may be accordingly decided as described above.

The foregoing calculation example is a calculation example when the angle of view is ±15 degrees right and left and video light is scanned so that a virtual image with a size corresponding to 60 inches can be viewed ahead 2.5 m. In this calculation example, the resolution of the video is assumed to be 720 P and the aspect ratio of the video is assumed to be 16:9.

In the image display device according to the invention, the resolution is not particularly limited. For example, the resolution may be 1080 P or 2160 P. Further, the aspect ratio is not particularly limited either. For example, the aspect ratio may be 4:3 or 2.35:1.

In this way, even when the slight difference is present in the interference fringe pitches between the first hologram element 351 and the second hologram element 651, the angle width or the angle change of the diffraction angles occurring in the first diffraction can be sufficiently offset in the second diffraction by setting the difference within the foregoing range, and thus the video can be affected as little as possible. In other words, when the difference in the interference fringe pitches between the first hologram element 351 and the second hologram element 651 is within the foregoing range, the influence on the video can be suppressed so that the observer can rarely recognize the influence by undergoing the diffraction twice despite the fact that the angle width or the angle change of the diffraction angles occurs in the first diffraction.

In the embodiment, however, the video light L3 is assumed to be diffracted to be incident on the eye EY of the observer. Therefore, when the interference fringe pitches of the second hologram element 651 are decided, it may be in some cases difficult to cause the advantages of suppressing the deterioration in the resolution and the color deviation to be compatible, as described above, by causing the video light L5 to be reliably incident on the eye EY of the observer depending on, for example, the size of the second hologram element 651, a distance between the second hologram element 651 and the observer, and a positional relation between the second hologram element 651 and the image generation unit 3.

In consideration of these cases, the reflection unit 6 according to the embodiment is configured such that the surface located on the side of the observer is the concave surface 611. That is, the surface shape of the second hologram element 651 on the incident side of the video light L3 is also formed as a concave surface. The surface shape of the second hologram element 651 on the incident side of the video light L3 may be at least a concave surface in a direction (that is, a direction vertical to the extension direction of the grating pattern of the second hologram) vertical to the diffraction grating of the second hologram element 651. By providing the second hologram element 651 on the concave surface 611, the concave surface 611 operates to reinforce the function of offsetting at least part of the angle width of the diffraction angles occurring in the first diffraction in the second diffraction in the second hologram element 651. That is, as described above, the second hologram element 651 condenses the video light L5 generated by the diffraction in the second hologram element 651 toward the eye EY of the observer. However, there is a background in which it is difficult to freely select the diffraction angle when the second hologram element 651 is designed based on the restriction of the above-described interference fringe pitches, specifically, the restriction in which the difference in the interference fringe pitches is not too large in the second hologram element 651.

In contrast, when the second hologram element 651 is provided on the concave surface 611 using the reflection unit 6 including the concave surface 611, as in the embodiment, the concave surface 611 has the equivalent function to a condensing lens. Therefore, the function of condensing the video light L5 toward the eye EY is reinforced. As a result, the observer can view the video with a large angle of view and high quality. As the condensing function is reinforced, the difference in the interference fringe pitches in the second hologram element 651 may not be large to the extent. That is, even when the angle width or the angle change of the diffraction angles occurring in the first diffraction may not be sufficiently offset in the second hologram element 651, at least part of the deficit of the offset can be supplemented by the concave surface 611.

Accordingly, the reflection unit 6 may be formed in a flat shape with a flat surface, but is preferably considered to include the concave surface 611 as in the embodiment. Accordingly, it is possible to more reliably suppress the deterioration in the resolution or the color deviation of the video caused due to the angle width or the angle change of the diffraction angles.

Here, for example, a calculation example in which conditions of the diffraction grating necessary to correct the position deviation or the color deviation of the video light L5 formed as the image on the retina of the observer are compared between when the reflection unit 6 has the concave surface 611 and when the reflection unit 6 has a flat surface instead of the concave surface 611 will be described.

When the flat surface is used instead of the concave surface 611 and a density at which the interference fringes provided in a central portion of the flat surface of the reflection unit 6 are formed is assumed to be 1550 per mm, it is necessary for a formation density to have a width in a range in which the minimum value is 980 per mm and the maximum value is 2200 per mm on the entire flat surface in the calculation. That is, the maximum difference in the formation density in the flat surface is 1220 per mm. The width of the formation density is based on the fact that there is a difference in an angle at which the video light L3 is diffracted in the flat surface of the reflection unit 6, as described above.

In contrast, in the embodiment, when the formation density of the interference fringes provided in the central portion of the concave surface 611 of the reflection unit 6 is assumed to be 1550 per mm, it is necessary for the formation density to have a width in a range in which the minimum value is 1490 per mm and the maximum value is 1700 per mm on the entire concave surface 611 in the calculation. That is, the maximum difference in the formation density in the flat surface is suppressed to 210 per mm.

In the calculation example, by providing the concave surface 611 in the reflection unit 6, it is provided that the difference in the interference fringe pitches formed in the reflection unit 6 is suppressed to be small. By suppressing the difference in the interference fringe pitches formed in the reflection unit 6 in this way, it is possible to achieve high quality in the entire video as well as the central portion of the video. This is because the difference in the interference fringe pitches between the first hologram element 351 and the second hologram element 651 when the interference fringe pitches are constant is suppressed. Therefore, the advantage of correcting the position deviation or the color deviation of the video light L5 formed as the image on the retina of the observer is enhanced in the entire reflection unit 6 (the entire video), and thus the high quality is achieved.

The shape of the concave surface 611 is not particularly limited. For example, the shape of the concave surface 611 may be a free curved surface (aspheric surface), a spherical surface, a hyperboloid, or a parabolic surface.

The extension direction of the interference fringes of the first hologram element 351 is preferably parallel to the extension direction of the interference fringes of the second hologram element 651. Specifically, in the case of FIG. 3, the extension direction of the interference fringes of the first hologram element 351 and the extension direction of the interference fringes of the second hologram element 651 are preferably directions perpendicular to the sheet surface. Accordingly, a relation between the diffraction direction (the emission direction of the diffracted light) of the incident light in the first diffraction and the diffraction direction (the emission direction of the diffracted light) of the incident light in the second diffraction is the same. Accordingly, the angle width or the angle change of the diffraction angles occurring in the first diffraction is offset more reliably than in the second diffraction.

From the viewpoint of obtaining at least the foregoing advantages, the extension direction of the interference fringes of the first hologram element 351 may not be necessarily parallel to the extension direction of the interference fringes of the second hologram element 651. For example, when the extension direction of the interference fringes of the first hologram element 351 is parallel to the extension direction of the interference fringes of the second hologram element 651, the foregoing advantages can be obtained even in a rotation state of the second hologram element 651 at any rotation angle using the axis orthogonal to the extension direction as a rotation axis, for example, a rotation state (a state in which a so-called "blast" is received) of the second hologram element 651 using the horizontal axis (the X axis) as the rotation axis.

The parallel state includes a deviation state of the complete parallelism at an angle width of ±2°.

The extension direction of the interference fringes (diffraction grating) of the second hologram element 651 is preferably orthogonal to the direction of the main scanning of the video light L3, that is, the horizontal direction. As described above, the angle width of the diffraction angles occurring in the first diffraction is the angle width which is the width of the video light L3 in the direction of the main scanning. Therefore, it is necessary to dispose the interference fringes so that the diffraction occurs to offset the angle width in the second diffraction. Accordingly, by matching the extension direction of the interference fringes of the second hologram element 651 to the direction orthogonal to the direction of the main scanning of the video light L3, the angle width of the diffraction angles occurring in the first diffraction can be more reliably offset in the second diffraction.

The orthogonal state includes a deviation state of the complete orthogonality at an angle width of ±2°.

In the image display device 1 according to the embodiment, as described above, the video is formed using the three pieces of color light, the red light, the green light, and the blue light. Accordingly, in each of the first hologram element 351 and the second hologram element 651, the interference fringes for the red light, the interference fringes of the green light, and the interference fringes of the blue light are superimposed (multiplexed) to be formed. Therefore, each of the first hologram element 351 and the second hologram element 651 can individually diffract and reflect the red light, the green light, and the blue light at an optimum angle. As a result, for each of the video light L5 formed from the red light, the video light L5 formed from the green light, and the video light L5 formed from the blue light, it is possible to suppress occurrence of the angle width or the angle change of the diffraction angles and it is possible to obtain the full-color video in which the deterioration of the resolution or the color deviation is suppressed.

Accordingly, as described above, the magnitude relation of the interference fringe pitches between the first hologram element 351 and the second hologram element 651 or the magnitude relation of the interference fringe pitches in the second hologram element 651 is individually and mutually independently established for the interference fringes for the red light, the interference fringes for the green light, and the interference fringes for the blue light. Therefore, for example, for the red light, the angle width or the angle change of the diffraction angles occurring in the first diffraction is offset at least partially in the second diffraction. Similarly, for the green light, the angle width or the angle change of the diffraction angles occurring in the first diffraction is offset at least partially in the second diffraction. Further, for the blue light, the angle width or the angle change of the diffraction angles occurring in the first diffraction is offset at least partially in the second diffraction.

To manufacture the first hologram element 351 or the second hologram element 651 described above, for example, any of various manufacturing methods such as an adhesion exposure scheme, a one-light flux interference scheme, a two-light flux interference scheme, and a collinear scheme is used.

To superimpose the interference fringes suitable for the plurality of kinds of light with the different wavelengths described above, exposure may be performed using a plurality of kinds of light with different wavelengths at the time of the exposure of an object to be processed in the manufacturing method.

Examples of the method of manufacturing the first hologram element 351 included in the light reflection unit 114 include a method of forming the first hologram element 351 in advance and subsequently attaching the first hologram element 351 to the plate-shaped member 113 and a method of disposing an object to be processed for forming a hologram element on a substrate with a light transmissive property, performing an exposure process or the like on the object to be processed, and subsequently disposing the hologram element in the support portion 15 using the substrate as the above-described plate-shaped member 113.

In the hologram element, when light with a wavelength used at the time of the manufacturing of the hologram element is incident, particularly, high diffraction efficiency is achieved and diffraction rarely occurs in the light with a wavelength other than the wavelength (wavelength selectivity is high). Accordingly, even when interference fringes for light with a different wavelength are superimposed on one hologram layer, it can be easy to maintain independence of the interference fringes for each piece of light and it is possible to suppress occurrence of the angle width or the angle change of the diffraction angles in each of the red light, the green light, and the blue light.

In the image display device 1, another color light may be added besides the red light, the green light, and the blue light. In contrast, light of colors less than three colors, that is, only light of one color or light of two colors, may be used.

In the embodiment, the light reflection unit 114 of the light scanning unit 36 is configured by the light diffraction unit 35. Therefore, the light diffraction unit 35 and the light scanning unit 36 are integrated, and thus it can be easy to handle both of the light diffraction unit 35 and the light scanning unit 36 and the volume of the image generation unit 3 can be decreased further than when the light diffraction unit 35 and the light scanning unit 36 are mutually independently provided. As a result, it can be easy to assemble (manufacture) the image display device 1 and it is possible to miniaturize the image display device 1 and realize low cost.

The video light L1 emitted from the video light generation unit 31 is projected to a specific position of the light diffraction unit 35 regardless of the content of the video. In other words, by configuring the light diffraction unit 35 as the light reflection unit 114 of the light scanning unit 36, an area necessary for the light diffraction unit 35 can be suppressed to be small further than, for example, when the light diffraction unit 35 is disposed between the light scanning unit 36 and the expansion optical system 4. Accordingly, according to the embodiment, the light diffraction unit 35 with the small area can be used, and thus it is possible to miniaturize the image display device 1 and realize low cost.

In the embodiment, the light diffraction unit 35 sways (reciprocates and rotates) as the light reflection unit 114. Therefore, the posture of the first hologram element 351 also changes with respect to the incident direction of the video light L1. As a result, the advantage of offsetting the angle width of the diffraction angles occurring in the first diffraction is enhanced further than when the light diffraction unit 35 does not sway. This is more prominent when the video light is projected toward the end portions 651*b* and 651*c* than when the video light is projected toward the central portion 651*a* in the second hologram element 651.

When the light diffraction unit 35 is formed as a surface relief type diffraction grating or a surface relief hologram element, an inclined surface of a surface relief groove reflects light in a mirror reflection manner. Therefore, it is desirable to appropriately set the shape of the surface relief groove so that the diffracted light diffracted in a predetermined direction based on the shape of the surface relief groove is oriented toward the light scanning unit 36.

Incidentally, in the image display device 1 according to the embodiment, as described above, the reflective diffraction element is swayed by the light scanning unit 36 including the light diffraction unit 35, so that the video light L3 which is the diffracted light is scanned and the video is formed.

Figure 12:
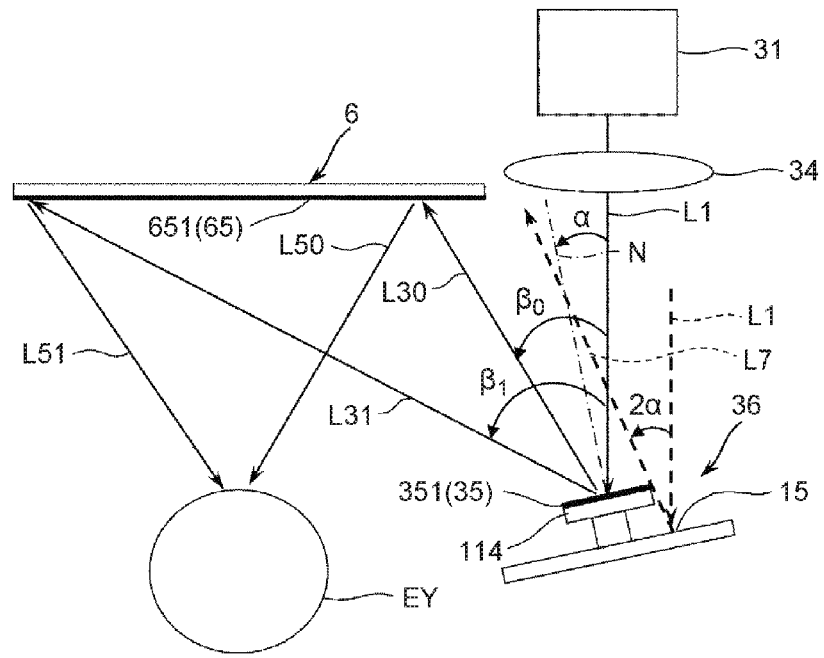
FIG. 12 is a diagram illustrating an example in which the video light scanned by the light scanning unit is projected to the reflection unit and is formed on a retina and a stray light occurrence principle.
Figure 13:
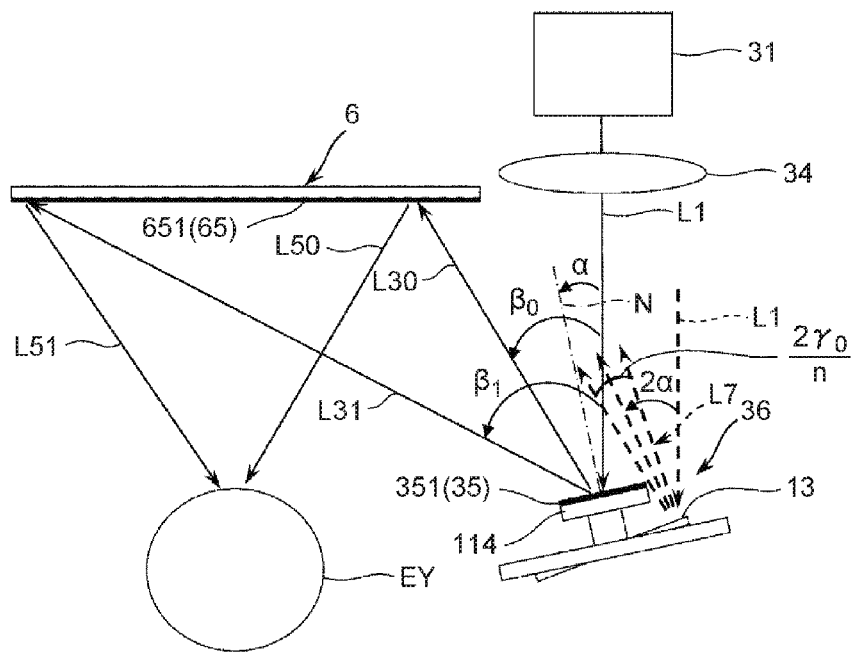
FIG. 13 is a diagram illustrating the example in which the video light scanned by the light scanning unit is projected to the reflection unit and is formed on the retina and the stray light occurrence principle.
Figure 14:
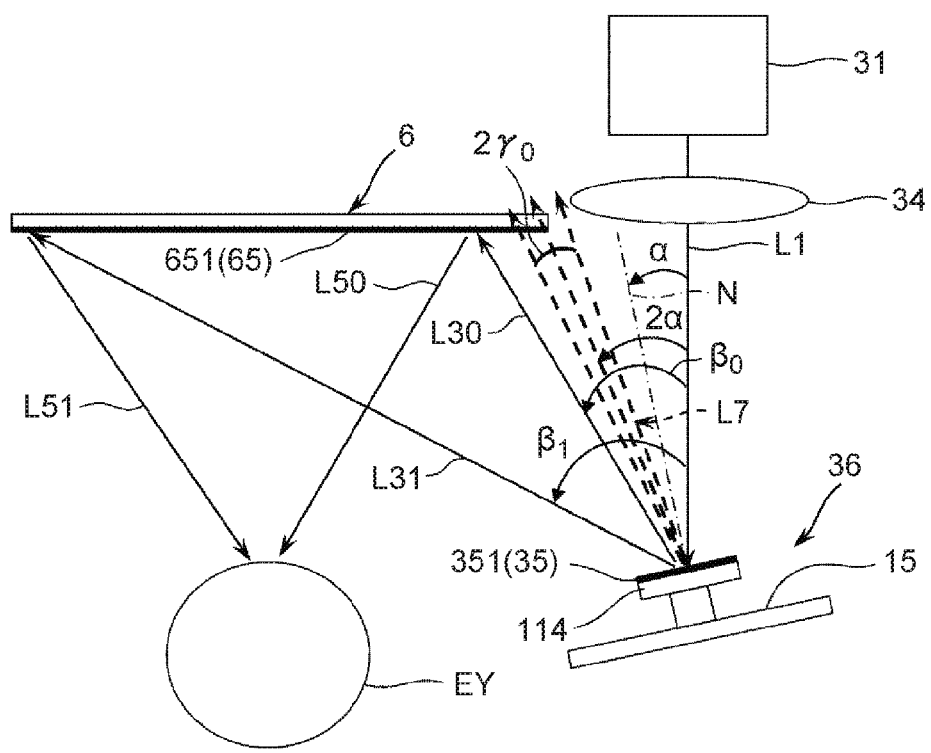
FIG. 14 is a diagram illustrating the example in which the video light scanned by the light scanning unit is projected to the reflection unit and is formed on the retina and the stray light occurrence principle.

FIGS. 12 to 14 are diagrams illustrating an example in which the video light scanned by the light scanning unit is projected to the reflection unit and is formed on a retina.

In the example illustrated in FIGS. 12 to 14, the posture of the entire light scanning unit 36 is maintained so that a normal line N of the light reflection unit 114 is inclined by only angle α with respect to the light axis of the video light L1. When the light scanning unit 36 is driven to sway the light reflection unit 114 (the light diffraction unit 35) in this state, the diffracted light is emitted with a predetermined angle width, specifically, within a range interposed between video light L30 and video light L31. As a result, the video light L30 and the video light L31 are projected to the reflection unit 6, and thus the diffracted light of the video light L30 and the diffracted light of the video light L31 are respectively formed as video light L50 and video light L51 on the retina of the eye EY of the observer.

In this example, an angle $\beta_0$ is assumed to be an angle formed by the light axis of the video light L1 and the light axis of the video light L30 and an angle $\beta_1$ is assumed to be an angle formed by the light axis of the video light L1 and the light axis of the video light L31 (here, $\beta_0 < \beta_1$).

Here, light contributing to the video formed in the same principle as the above-described principle in the video light L1 is only the light incident on the light reflection unit 114 (the light diffraction unit 35). However, since the video light L1 projected toward the light scanning unit 36 is projected with an angle width to some extent, the entire video light L1 is not diffracted in the light diffraction unit 35. Part of the video light L1 is reflected in the surface of the light diffraction unit 35 or the surface of the plate-shaped member 113 or the surface of each portion of the light scanning unit 36. The video light L1 reflected in this way is projected in an unintended direction, but part of the video light L1 is incident as stray light on the retina. Such stray light results in deterioration in the visibility of the video and deterioration in the image quality.

Of the drawings, FIG. 12 illustrates an example of a case in which part of the video light L1 arrives at the support portion 15 included in the light scanning unit 36 when the video light L1 is projected toward the light scanning unit 36.

As illustrated in FIG. 6, the support portion 15 is a portion that supports the movable mirror 11 and the posture is not changed regardless of the swaying of the movable mirror 11. In the example of FIG. 12, the posture of the entire light scanning unit 36 is maintained so that the normal line N of the surface of the light reflection unit 114 (the light diffraction unit 35) with respect to the light axis of the video light L1 is inclined by the angle α. Therefore, the angle formed by the light axis of the video light L1 and the normal line of the surface of the support portion 15 is the angle α. As a result, when the video light L1 is reflected from the surface of the support portion 15, reflected light L7 is projected in a direction inclined by an angle 2α with respect to the light axis of the video light L1.

Accordingly, it is necessary to configure the image display device 1 so that the reflected light L7 emitted from the support portion 15 is not incident on the retina of the observer.

Specifically, in the example illustrated in FIG. 12, the image display device 1 preferably satisfies formula [1] below.

$$2\alpha < \beta_0 \quad [1]$$

By configuring the image display device 1 so that such a condition is satisfied, it is possible to decrease a probability at which the reflected light L7 reaches an effective range of the second hologram element 651, that is, a specific range of the second hologram element 651 in which the light can be diffracted toward the eye EY of the observer. In other words, it is possible to reduce a probability at which the reflected light L7 reflected from the portion such as the support portion 15 becomes stray light. As a result, it is possible to suppress the deterioration in the visibility of the video.

When the stray light emitted from the support portion 15 is incident on the retina, a time at which the stray light is continuously incident is overwhelmingly longer than a time in which the video light L50 and the video light L51 are continuously incident. Therefore, the luminance of the stray light is considerably larger than the luminances of the video light L50 and the video light L51. Therefore, from the viewpoint of improving the visibility of the video, it is very effective to satisfy the above-described condition and avoid the incidence of the stray light.

Formula [1] above can also be applied to portions other than the support portion 15.

FIG. 13 illustrates an example of a case in which part of the video light L1 arrives at the frame body 13 included in the light scanning unit 36 when the video light L1 is projected toward the light scanning unit 36.

As illustrated in FIG. 6, the frame body 13 is a portion that supports the movable mirror 11 and is the portion of which a posture is changed with the swaying of the movable mirror 11, as illustrated in FIG. 13. In the example of FIG. 13, the posture of the entire light scanning unit 36 is maintained so that the normal line N of the surface of the light reflection unit 114 (the light diffraction unit 35) with respect to the light axis of the video light L1 is inclined by the angle α. Therefore, the angle formed by the light axis of the video light L1 and the normal line of the surface of the frame body 13 is the angle α. As a result, when the video light L1 is reflected from the surface of the frame body 13, the reflected light L7 is projected in a direction inclined by the angle 2α with respect to the light axis of the video light L1.

On the other hand, as described above, the frame body 13 sways with the swaying of the movable mirror 11, but the amplitude of the swaying is less than the amplitude of the swaying of the movable mirror 11. When $\gamma_0$ is the amplitude of the swaying of the movable mirror 11 and n is a magnification of the amplitude of the swaying of the movable mirror 11 with respect to the amplitude of the swaying of the frame body 13, the amplitude of the swaying of the frame body 13 is expressed as $\gamma_0/n$.

Accordingly, it is necessary to configure the image display device 1 so that the reflected light L7 emitted from the frame body 13 is not incident on the retina of the observer.

Specifically, in the example illustrated in FIG. 13, the image display device 1 preferably satisfies formula [2] below.

$$\frac{\gamma_0}{n} + 2\alpha < \beta_0 \quad [2]$$
$$\alpha < \frac{\beta_0}{2} - \frac{\gamma_0}{2n}$$

By configuring the image display device 1 so that such a condition is satisfied, it is possible to decrease a probability at which the reflected light L7 reaches an effective range of the second hologram element 651, that is, a specific range of the second hologram element 651 in which the light can be diffracted toward the eye EY of the observer. In other words, it is possible to reduce a probability at which the reflected light L7 reflected from the portion such as the frame body 13 becomes stray light. As a result, it is possible to suppress the deterioration in the visibility of the video.

When the stray light emitted from the frame body 13 is incident on the retina, the amplitude of the swaying of the frame body 13 is less than the amplitude of the swaying of the movable mirror 11. Therefore, the luminance of the stray light emitted from the frame body 13 is larger than the luminances of the video light L50 and the video light L51. Therefore, from the viewpoint of improving the visibility of the video, it is very effective to satisfy the above-described condition and avoid the incidence of the stray light.

FIG. 14 illustrates an example of a case in which part of the video light L1 arrives at the surface of the light diffraction unit 35 configuring the light reflection unit 114 of the light scanning unit 36 when the video light L1 is projected toward the light scanning unit 36.

The first hologram element 351 configuring the light diffraction unit 35 has the interference fringes therein and functions as a reflective diffraction element. As illustrated in FIG. 6, the light diffraction unit 35 configures the light reflection unit 114 and is a portion of which a posture is changed with the swaying of the movable mirror 11. In the example of FIG. 14, the posture of the entire light scanning unit 36 is maintained so that the normal line N of the surface of the light reflection unit 114, that is, the normal line of the surface of the light diffraction unit 35, with respect to the light axis of the video light L1 is inclined by the angle α. Therefore, the angle formed by the light axis of the video light L1 and the normal line of the surface of the light diffraction unit 35 is the angle α. As a result, when the video light L1 is reflected from the surface of the light diffraction unit 35, the reflected light L7 (so-called 0th-order light) is projected in a direction inclined by the angle 2α with respect to the light axis of the video light L1.

On the other hand, when $\gamma_0$ is the amplitude of the swaying of the movable mirror 11, an angle formed by the light axis of the video light L1 and the light axis of the reflected light L7 is $\gamma_0 + 2\alpha$ when the reflected light L7 becomes stray light.

Accordingly, it is necessary to configure the image display device 1 so that the reflected light L7 emitted from the surface of the light diffraction unit 35 is not incident on the retina of the observer.

Specifically, in the example illustrated in FIG. 14, the image display device 1 preferably satisfies formula [3] below.

$$\gamma_0 + 2\alpha < \beta_0 \quad [3]$$

$$\alpha < \frac{\beta_0 - \gamma_0}{2}$$

By configuring the image display device 1 so that such a condition is satisfied, it is possible to decrease a probability at which the reflected light L7 reaches an effective range of the second hologram element 651, that is, a specific range of the second hologram element 651 in which the light can be diffracted toward the eye EY of the observer. In other words, it is possible to reduce a probability at which the reflected light L7 reflected from the surface of the light diffraction unit 35 becomes stray light. As a result, it is possible to suppress the deterioration in the visibility of the video.

Second Embodiment

Next, a second embodiment of the image display device according to the invention will be described.

Figure 15A:
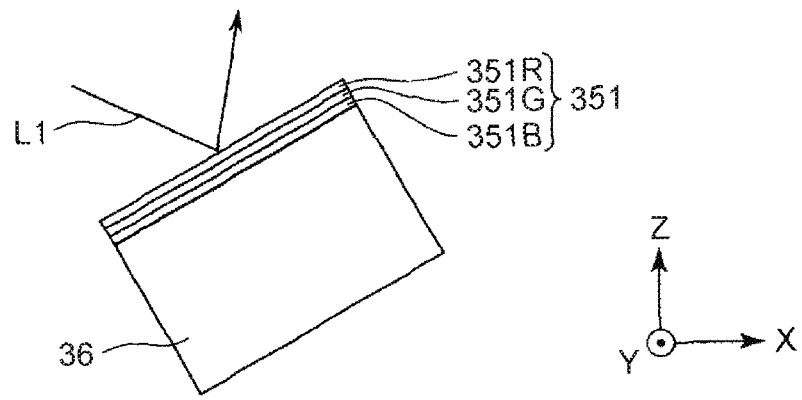
FIGS. 15A and 15B are diagrams schematically illustrating a configuration of a second embodiment of the image display device according to the invention.
Figure 15B:
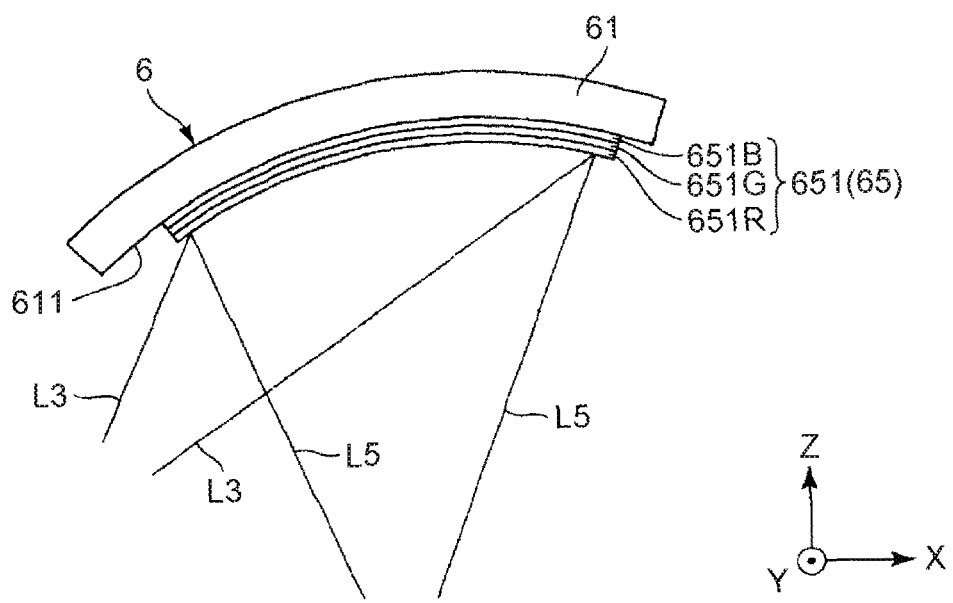

FIGS. 15A and 15B are diagrams schematically illustrating a configuration of the second embodiment of the image display device according to the invention.

Hereinafter, the second embodiment will be described. In the following description, differences from the above-described first embodiment will be mainly described and the description of the same portions will be omitted. In the drawings, the same reference numerals are given to the same portions as those of the above-described embodiment.

An image display device 1 according to the second embodiment is the same as the image display device 1 according to the first embodiment except that the configurations of the first hologram element 351 and the second hologram element 651 are different.

That is, in each of the first hologram element 351 and the second hologram element 651 according to the above-described first embodiment, interference fringes for red light, interference fringes for green light, and interference fringes for blue light are superimposed (multiplexed) to be formed at different pitches in a one-layered hologram layer so that three pieces of color light, the red light, the green light, and the blue light, are individually diffracted.

However, as illustrated in FIGS. 15A and 15B, the first hologram element 351 according to the embodiment is configured as a laminate in which a hologram layer 351R diffracting the red light, a hologram layer 351G diffracting the green light, and a hologram layer 351B diffracting the blue light are stacked.

Similarly, as illustrated in FIGS. 15A and 15B, the second hologram element 651 according to the embodiment is configured as a laminate in which a hologram layer 651R diffracting the red light, a hologram layer 651G diffracting the green light, and a hologram layer 651B diffracting the blue light are stacked.

In the embodiment, since the interference fringes for the red light, the interference fringes for the green light, and the interference fringes for the blue light are formed in the mutually different hologram layers in this way, deterioration of the diffraction efficiency caused due to the superimposition of the interference fringes is suppressed. Therefore, in the embodiment, it is possible to improve the diffraction efficiency of each of the first hologram element 351 and the second hologram element 651.

The magnitude relation of the interference fringe pitches between the first hologram element 351 and the second hologram element 651 or the magnitude relation of the interference fringe pitches in the second hologram element 651, as described in the first embodiment, is individually and mutually independently established for the interference fringes for the red light, the interference fringes for the green light, and the interference fringes for the blue light in the embodiment. Therefore, for example, for the red light, the angle width or the angle change of the diffraction angles occurring in the first diffraction is offset at least partially in the second diffraction. Similarly, for the green light, the angle width or the angle change of the diffraction angles occurring in the first diffraction is offset at least partially in the second diffraction. Further, for the blue light, the angle width or the angle change of the diffraction angles occurring in the first diffraction is offset at least partially in the second diffraction.

The stack order of the hologram layers 351R, 351G, and 351B and the stack order of the hologram layers 651R, 651G, and 651B are not limited to the stack orders illustrated in FIGS. 15A and 15B.

In the above-described second embodiment, it is also possible to obtain the same operations and advantages as those of the first embodiment.

Third Embodiment

Next, a third embodiment of the image display device according to the invention will be described.

Figure 16:
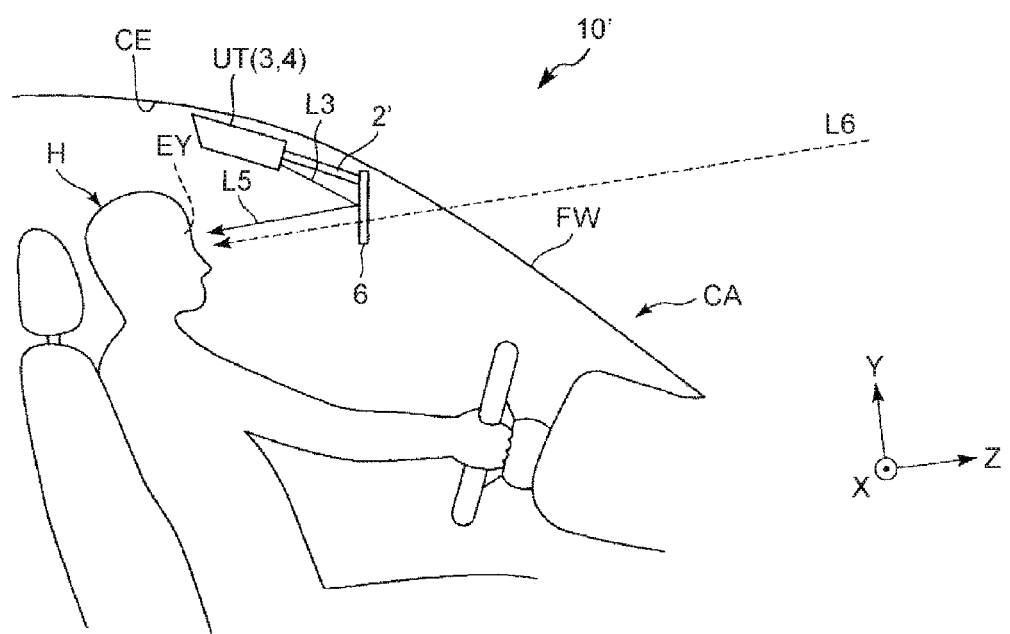
FIG. 16 is a diagram schematically illustrating an overall configuration of a head-up display of a third embodiment including the image display device according to the invention.

FIG. 16 is a diagram schematically illustrating an overall configuration of a head-up display of the third embodiment including the image display device according to the invention.

Hereinafter, the third embodiment will be described. In the following description, differences from the above-described first and second embodiments will be mainly described and the description of the same portions will be omitted. In the drawings, the same reference numerals are given to the same portions as those of the above-described embodiments.

An image display device 1 according to the third embodiment is the same as the image display device 1 according to the first and second embodiments except that the image display device 1 is included in a head-up display 10' mounted on a ceiling portion of an automobile for use.

That is, the image display device 1 according to the third embodiment is mounted on a ceiling portion CE of an automobile CA for use and causes an observer to view a virtual image and an outside image in a superimposition state.

As illustrated in FIG. 16, the image display device 1 includes a light source unit UT including an image generation unit 3 and an expansion optical system 4, a reflection unit 6, and a frame 2' connecting the light source unit UT to the reflection unit 6.

In the embodiment, a case in which the light source unit UT, the frame 2', and the reflection unit 6 are mounted on the ceiling portion CE of the automobile CA will be exemplified. The light source unit UT, the frame 2', and the reflection unit 6 may be mounted on a dashboard of the automobile CA or some of the configuration may be fixed to a front window FW. Further, the head-up display 10' may be mounted not only on an automobile but also on any of various moving objects such as an airplane, a ship, a construction machinery, a heavy machinery, a two-wheeled vehicle, a bicycle, and a space ship.

Hereinafter, the units of the image display device 1 according to the embodiment will be sequentially described in detail.

The light source unit UT may be fixed to the ceiling portion CE in accordance with any method. For example, the light source unit UT is fixed in accordance with a method of mounting the unit on a sun visor using a band, a clip, or the like.

The frame 2' includes, for example, a pair of long members, and thus the light source unit UT and the reflection unit 6 are fixed by connecting both ends of the light source unit UT and the reflection unit 6 in the X axis direction.

The light source unit UT includes the image generation unit 3 and the expansion optical system 4, and thus the video light L3 is emitted from the expansion optical system 4 to the reflection unit 6. Then, the video light L5 diffracted and reflected by the reflection unit 6 is formed as an image on the eye EY of the observer.

On the other hand, the reflection unit 6 according to the embodiment also has a function of transmitting outside light L6 oriented from the outside of the reflection unit 6 to the eye EY of the observer at the time of use. That is, the reflection unit 6 has a function of reflecting the video light L3 from the light source unit UT and transmitting the outside light L6 oriented from the outside of the automobile CA to the eye EY of the observer via the front window FW at the time of use. Accordingly, the observer can view the outside image and simultaneously view a virtual image (image) formed by the video light L5. That is, the see-through head-up display can be realized.

In the third embodiment, it is also possible to obtain the same operations and advantages as those of the first and second embodiments.

That is, in the image display device 1 according to the embodiment, at least part of the angle width or the angle change of the diffraction angles occurring in the first diffraction can be offset in the second diffraction. Accordingly, the observer can view the high-quality video in which the deterioration in the resolution or the color deviation is sufficiently suppressed.

The image display device according to the invention has been described above based on the illustrated embodiments, but the invention is not limited thereto.

For example, in the image display device according to the invention, the configuration of each unit can be substituted with any configuration having the same function and any configuration can also be added.

Embodiments of the image display device according to the invention are not limited to the head-mounted display or the head-up display described above, but any image display device can be included as long as the image display device has a display principle of a retina scanning scheme.

The entire disclosure of Japanese Patent Application No. 2015-038583, filed Feb. 27, 2015 is expressly incorporated by reference herein.

What is claimed is:
1. An image display device comprising:
a video light generation unit that generates video light modulated based on a video signal;
a light scanner that includes a light reflection unit, the light reflection unit including a first diffraction optical element, the first diffraction optical element diffracting the video light emitted from the video light generation unit, the light scanner spatially scanning the video light by diffracting and reflecting the video light in the light reflection unit so as to output a scanned video light; and
a second diffraction optical element that diffracts the scanned video light when the scanned video light is incident,
wherein the light reflection unit is configured by the first diffraction optical element,
the first diffraction optical element is configured to rotate along with the light reflection unit,
wherein the light scanner performs main scanning of the video light in a first direction and performs sub-scanning of the video light in a second direction orthogonal to the first direction,
wherein in the first diffraction optical element, a diffraction grating period is constant, and
wherein the second diffraction optical element has portions in which the diffraction grating period is mutually different from a diffraction grating period on a scanning line of the main scanning passing through a center of an amplitude of the sub-scanning of the scanned video light incident on the second diffraction optical element.

2. The image display device according to claim 1, wherein in the second diffraction optical element, a surface on which an incident video light corresponding to the scanned video light is incident is a concave surface in a direction perpendicular to a diffraction grating of the second diffraction optical element.

3. The image display device according to claim 1, wherein the diffraction grating period of the first diffraction optical element is between a maximum value and a minimum value of the diffraction grating period on the scanning line of the main scanning passing through the center of the amplitude of the sub-scanning of the scanned video light incident on the second diffraction optical element.

4. The image display device according to claim 1, wherein the diffraction grating period of the first diffraction optical element is the same as a diffraction grating period at a position of the center of an amplitude of the main scanning and on the scanning line of the main scanning passing through the center of the amplitude of the sub-scanning of the scanned video light incident on the second diffraction optical element.

5. The image display device according to claim 1, wherein the diffraction grating period of the first diffraction optical element is the same as an average value of the diffraction grating period on the scanning line of the main scanning passing through the center of the amplitude of the sub-scanning of the scanned video light incident on the second diffraction optical element.

6. The image display device according to claim 1, wherein an extension direction of the diffraction grating of the second diffraction optical element is orthogonal to the first direction.

7. The image display device according to claim 1, wherein the light scanner includes a driving system that reciprocates and rotates the light reflection unit, and
wherein when $\gamma_0$ is an amplitude of the reciprocation and the rotation, $\alpha$ is an angle formed by an optical axis of the video light and a normal line of the light reflection unit when the light reflection unit does not rotate, and $\beta_0$ is a minimum value of an angle formed by the light axis of the video light incident on the light reflection unit when the light reflection unit reciprocates and rotates and the light axis of the video light emitted from the light reflection unit, a formula below is satisfied:

$$\alpha < \frac{\beta_0 - \gamma_0}{2}.$$

8. The image display device according to claim 1, further comprising:
a pupil expansion optical system that is provided on a light path between the light scanner and the second diffraction optical element.

9. An image display device comprising:
a video light generation unit that generates video light modulated based on a video signal;
a light scanner that includes a light reflection unit, the light reflection unit including a first diffraction optical element, the first diffraction optical element diffracting the video light emitted from the video light generation unit, the light scanner spatially scanning the video light by diffracting and reflecting the video light in the light reflection unit so as to output a scanned video light; and
a second diffraction optical element that diffracts the scanned video light when the scanned video light is incident,
wherein the light reflection unit is configured by the first diffraction optical element,
the first diffraction optical element is configured to rotate along with the light reflection unit,
wherein the light scanner includes a driving system that reciprocates and rotates the light reflection unit, and
wherein when $\gamma_0$ is an amplitude of the reciprocation and the rotation, $\alpha$ is an angle formed by an optical axis of the video light and a normal line of the light reflection unit when the light reflection unit does not rotate, and $\beta_0$ is a minimum value of an angle formed by the light axis of the video light incident on the light reflection unit when the light reflection unit reciprocates and rotates and the light axis of the video light emitted from the light reflection unit, a formula below is satisfied:

$$\alpha < \frac{\beta_0 - \gamma_0}{2}.$$

* * * * *